United States Patent [19]

Yoshimura et al.

[11] Patent Number: 4,766,033

[45] Date of Patent: Aug. 23, 1988

[54] HIGHLY HEAT-SENSITIVE FILM FOR STENCIL

[75] Inventors: Isao Yoshimura, Fujisawa; Takashi Nakao, Kawasaki; Mitsuo Kohno, Yokohama, all of Japan

[73] Assignee: Asahi Kasei Kogyo Kabushiki Kaisha, Osaka, Japan

[21] Appl. No.: 885,210

[22] Filed: Jul. 14, 1986

[30] Foreign Application Priority Data

Jul. 15, 1985 [JP] Japan ............................ 60-154308
Feb. 5, 1986 [JP] Japan ............................ 61-22145
Feb. 17, 1986 [JP] Japan ............................ 61-30643

[51] Int. Cl.[4] ........................ B32B 27/06; B41C 1/14; B41N 1/24

[52] U.S. Cl. .................................. 428/332; 428/340; 428/481; 428/479.6; 428/227; 428/229; 428/364; 428/442; 428/518; 428/910; 428/516; 428/476.1; 427/143; 264/176.1

[58] Field of Search ................ 427/143; 428/332, 340, 428/481, 479.6, 227, 229, 364

[56] References Cited

U.S. PATENT DOCUMENTS 3,595,166 7/1971 Sherman ........................ 427/143 X
3,696,742 10/1972 Parts et al. ...................... 427/143 X

OTHER PUBLICATIONS

Derwent Pub. Ltd., 85-155305/26, J6 0085-996-A, Dynic Corp., "Heat Sensitive Mimeograph Plate", Dyni 10-18-83.

*Primary Examiner*—P. C. Ives
*Attorney, Agent, or Firm*—Birch, Stewart, Kolasch & Birch

[57] ABSTRACT

The present invention relates to a highly sensitive heat-sensitive film for stencil. This invention provides a highly heat-sensitive film for stencil, comprising a thermoplastic resin having a coefficient of temperature and melt viscosity ($\Delta T/\Delta \log VI$) of not more than 100 and a thermal shrinkage (X%) at 100° C. and a thermal shrinkage stress (Y g/mm²) at 100° C. falling respectively in the ranges of the formulas; $15 \leqq X \leqq 80$ and $75 \leqq Y \leqq 500$; and both falling in the range of the formula; $-8X+400 \leqq Y \leqq -10X+1000$; having a thickness in the range of 0.5 to 15 μm, and excelling in low-energy perforation property.

The film of this invention is superior in a low temperature perforation property, capable of being perforated with a low energy thermal head or with a low energy flash irradiation for making a plate; expansion of perforations is small when the film is perforated; and its change with time (dimensional change) is small and its sizes are stable.

20 Claims, 6 Drawing Sheets

0.5 mm 0.5 mm

HIGHLY HEAT-SENSITIVE FILM FOR STENCIL

BACKGROUND OF THE INVENTION

1. Field of the Invention

This invention, in one aspect thereof, relates to a film which can be effectively perforated by the use of the nature of electromagnetic waves as energy sources generated as by the flash irradiation for a very brief period (such as, for example, 1/1000 second) using a halogen lamp, a xenon lamp, a krypton lamp, or a flash-bulb, the infrared irradiation, or the pulse irradiation of laser beam, particularly in the low energy zone. The invention, in another more desirable aspect, relates to a stretched film for a highly heat-sensitive stencil, which is effectively perforated by direct or indirect contact with a low energy source, i.e. a so-called thermal head composed of a multiplicity of fine heating elements and to a stencil sheet formed by laminating the aforementioned film on a porous supporting member which is pervious to printing ink and incapable of being substantially degenerated during the course of perforation of the film.

2. Description of the Prior Art

Heretofore, as means of preparing a heat-sensitive stencil sheet, a method has been known which comprises using as a heat source a visible irradiation and an infrared radiation generated by the flash irradiation method, causing the heat radiation to be absorbed in an original having letters, figures, and other patterns displayed thereon with a heat radiation absorbing substance, and allowing the absorbed heat to be transferred to an overlying film held in contact with the display part thereby melting to perforate the display substance to complete a perforated stencil. Besides, it has also been known to the art that a porous supporting member of non-woven, woven, or otherwise formed fabric of fibers pervious to printing ink is used as bonded to the film to prevent the letters or figures formed thereon from being erased accidentally during the course of perforation or printing.

Then, the method which prepares a stencil sheet by applying the electric power in the form of pulse signals selectively on the elements falling within a prescribed position through contact of the film with the heating elements and enabling the heat consequently generated to perforate the film has been known also in the art.

As concerns the versions of the former method, the specifications of Japanese Patent Publication No. 7623/1966 discloses a method which uses a stencil sheet obtained by laminating a stretched heat-sensitive resin sheet such as, for example, a stretched polypropylene sheet having a thermal shrinkage factor (area shrinkage factor during actual use) in the range of 0.3 to 2% with a thin tissue and effects perforation of the laminate with infrared radiation; the specification of Japanese Patent Publication No. 23713/1968 discloses a method which prepares a stencil sheet by similarly using a film manufactured by heat treating a stretched film of vinylidene chloride type resin so as to adjust the area thermal shrinkage factor of the film during the course of its actual use in the range of 0.5 to 3%; the specification of Japanese Patent Publication No. 10860/1974 discloses a method which prepares a stencil sheet by similarly using a film of an ethylene-vinyl acetate copolymer 10 to 70 μm in thickness; the specification of Japanese Patent Application Laid-open No. 2513/1976 discloses a method which prepares a stencil sheet by similarly using a film of polyethylene terephthalate 4 to 20 μm in thickness heat treated so as to have a density in the range of 1.375 to 1.385 (g/cm$^3$), i.e. a degree of crystallinity in the range of 32 to 39%; and the specification of Japanese Patent Application Laid-open No. 85996/1985 discloses a method which prepares a stencil sheet by using a polyethylene terephthalate film having a thickness of 2 to 3.5 μm and a longitudinal/lateral shrinkage factor of 2.5/1.9 (%) at 150° C., for example.

As the versions of the latter method, the specification of Japanese Patent Application Laid-open No. 49519/1978 and that of Japanese Patent Application Laid-open No. 33117/1979 disclose a method which prepares a stencil sheet by perforating a commercially available film of crystallized polyethylene terephthalate through contact of the film with dots of heating elements and the specification of Japanese Patent Application Laid-open No. 49398/1985 discloses a method which prepares a stencil sheet by using a stretched film of polyethylene terephthalate not more than 4 μm in thickness, on the condition that the melting point (m.p.) of the film 2 μm in thickness should fall in the range of 255° to 260° C. to ensure satisfactory perforation.

The heat-sensitive stencil sheet which is prepared for printing with the perforation effected by the flash irradiation of an energy irradiation among other methods of perforation enumerated above is composed, as widely known in the art, by bonding a biaxially stretched thermoplastic resin film to a porous supporting member. At present, the film used in this stencil sheet is such that the effective perforation thereof is not effectively attained unless the flash irradiation of light is performed at a high energy level. In the case of the latter method, although the idea itself has been proposed, it has not been realized yet owing to various problems, including particularly the fact that no existing film is practicable because of lack of sensitivity high enough to cope with the thermal head of low energy level. In the circumstance, a study is being promoted with a view to overcoming the drawback by developing a thermal head capable of operating at heightened energy levels.

For the purpose of developing a film desirable for the formation of a stencil sheet, films formed of various biaxially stretched thermoplastic resins have been tested. All these films have various problems of their own which stand in the way of their practical adoption. The only stencil sheet grade films being accepted in the market are commercially available biaxially stretched polyethylene terephthalate film of high crystallinity having a thickness of 2 to 3 μm and enjoying both dimensional stability and thermal resistance and biaxially stretched films of vinylidene chloride type copolymers 7 to 10 μm in thickness. Even these films have various problems of their own.

The method which produces a printed copy by placing the perforated stencil sheet prepared as described above on a printing sheet of paper and applying stencil ink or screen printing ink on the stencil sheet thereby forcing the applied ink through the perforated letters or figures onto the underlying printing paper has been known to the art.

The conventional highly crystallized polyethylene terephthalate film used in the commercially available stencil sheets, because of its desirable workability (high modulus of elasticity enough to facilitate handling) and high dimensional stability, has found utility in the stencil sheet to be used in the automatic printing machine as a plate-making system relying for perforation on the flash irradiation method. The stencil sheet grade film disclosed in the specification of Japanese Patent Application Laid-open No. 48398/1985 and the specification of Japanese Patent Application Laid-open No. 85996/1985 are examples. These inventions are characterized by using films which have high degrees of crystallinity (such as, for example, at least 40% as determined by the density method). On the other hand, since these films have high crystal melting points, they cannot be easily used unless they have their thickness decreased to below 3 μm for improving the perforation property, if only slightly. These known films have such main components which start shrinking at high temperatures on the order of 170° C., for example. Owing to this shrinkage coupled with various other properties, the energy required for the perforation in such films is at a high level. The plate making by virtue of thermal energy necessitates use of an expensive xenon flash lamp of a large energy output. The films are mainly used in the region of such high energy. Moreover, the films to be used as stencil sheets must have a thickness as small as 2 μm, for example, for the purpose of gaining in sensitivity as much as possible.

No further improvement of sensitivity can be expected of the films even when they lose their thickness appreciably any more. Their existing thickness is already at the limit. In this respect, as demonstrated afterward in comparative experiments, there are cases that a further decrease of thickness results conversely in degradation of sensitivity. This phenomenon is possibly ascribed to complicated factors which are involved during the perforation effected by the flash irradiation for an extremely brief period. It may be logically explained by a postulate that since the film is too thin for the heat to be stored sufficiently within the film, the heat imparted thereto is radiated instantaneously and the time required for retaining stress necessary for perforation is insufficient or by a postulate that the absolute value of the stress required for the perforation of the film as a whole dwindles. Besides, various problems such as the lack of efficiency of the manufacture of film, the possibility of the film sustaining ruptures at various steps of the production process, the lack of nerve in the film, the serious effects of static electricity generated, the occurrence of wrinkles, the inconvenience encountered during the work of lamination, and the loss of printing durability have suddenly come to attract keen attention. Inevitably, the existing films are expensive and unsatisfactory.

The biaxially stretched film of vinylidene chloride type copolymer which is generally used in the application in question has a slightly low perforation energy level as compared with the aforementioned polyethylene terephthalate film where the perforation is effected by the flash irradiation method and can be perforated with a flash lamp of a small energy output which fails to provide any ample perforation for the aforementioned polyethylene terephthalate film. Thus, perforation is effected at present by a method and apparatus which both prove simple and inexpensive.

This film, however, suffers from a disadvantage that when the perforation is effected by the flash irradiation method, and that by the use of a xenon lamp of high energy level, the resolving power thereof is degraded, i.e. the dots and lines of the perforated letters or images tend to be widened. Further, during the flash irradiation, such dots and lines tend to spread out by picking up dust, dirt, and surface irregularities of the original or they are fused to the original and, during the subsequent separation of the film from the original, the fused part tends to inflict a serious fracture on the perforated part of the film, damaging the film as a whole. There is another problem that the plasticizer contained in the film is decomposed with evolution of a corrosive gas at the elevated temperature.

Moreover, the film is deficient in dimensional stability and workability (at various steps of production process, including the formation of film, lamination of film on a supporting member, and perforation and printing performed on the stencil sheet). The film as a whole is also deficient in resolving power and printing durability. The film, therefore, finds utility barely in simplified printing machines for which the resolving power of lower degree suffices than the aforementioned automatic printing machine, especially in applications which have no use for prints of high quality. For example, the specification of Japanese Patent Application Laid-open No. 82921/1973 discloses a method which involves use of a vinylidene chloride type copolymer film amply heat treated so as to control the area thermal shrinkage factor in the working temperature zone in the range of 0.5 to 3.0%.

For the reason arising from the convenience of process, the aforementioned vinylidene chloride type film cannot be easily stretched to a thin thickness (high susceptibility to puncture and rupture and deficiency in strength and nerve (modulus)). Moreover, the physical properties, especially the stretchability, of the stretched film are liable on aging to be affected by the phenomenon of crystallization or by the action of the plasticizer, for example. As a natural consequence, the perforation property of the film is liable to vary. It is deficient in dimensional stability and liable to shrink. The film wound in a roll tends to shrink and, on being unwound from the roll and spread out, tends to sag and gather wrinkles. When this film is laminated with a supporting member with an adhesive and then dried, the resulting laminate shrinks heavily. To preclude the drawback, therefore, the film must be given a heat treatment to either mitigate or stabilize the orientation for the promotion of dimensional stability. This measure heavily affects the perforation sensitivity and must be carried out at a sacrifice of important properties.

The film has very weak nerve (modulus of elasticity) falling on the order of about 30 $kg/mm^2$, a value notably low as compared with 400 to 600 $kg/mm^2$ recorded for the commercially available polyethylene terephthalate, and further suffers from poor workability. The drawback, coupled with the disadvantages mentioned above, makes it hardly conceivable to use this film in a thickness somewhere around 2 to 3 μm.

Since the existing films mentioned above have various problems, the appearance of a special film which is free from these problems, possesses a highly desirable performance warranting wide perforating conditions, high sensitivity, and high resolving power, and enjoys balanced properties is longed for.

This invention, in another aspect, relates to a method which effects perforation of a stencil sheet by the use of a thermal printer or thermal head used in the thermal printers for word processors, terminal devices, printers or facsimiles, i.e. the printers developed to keep pace with the rapid growth of electronic devices. The films used in this field are, therefore, expected to offer advanced properties including sensitivity of perforation and resolving power. The truth is that none of the films developed to date has satisfied the expectation. The printing resorting to the method of perforation under discussion has found no acceptance for the reasons for which the films are responsible. One particularly important requirement is that the perforation should be attained accurately and quickly with the heat of low energy. The films so far introduced invariably have much to be desired and are urging the necessity for further study. The thermal head to be used effectively for the perforation of the stencil sheet calls for a heat source of still lower energy level than any of the methods mentioned above.

Now, the perforation of the stencil sheet by the thermal head element will be described below. The thermal head of the existing principle has been adapted for the system which effects the printing by applying a wax of low melting point (such as 60° C.) containing a dye (black or some other color) as an image developing medium to the film, melting the applied developing medium with the heat transferred from the head through the film, and transferring the molten developing medium to the copying paper (as adopted for the word processor, the facsimile, and printers) or for the system which effects the printing by heating the prescribed parts of a paper coated with a dye capable of reacting and producing a color on exposure to heat and causing the dye in the affected parts to form an image (as adopted for the facsimile, for example). In this field, the thermal head has been finding a rapidly growing market in recent years. In the applications mentioned above, the heat generating elements used in the thermal head are required to produce printed letters formed of dots of gradually decreasing size for the purpose of improving the quality of prints. A technically important point in the system is to make the printed letters clear with fine dots. A host of producers are competing among many manufacturers for early development of heat generating elements which satisfy the requirement.

Because of the great efforts devoted to improving the quality of the thermal head and to miniaturizing the elements, these heat generating elements are inevitably expensive. For the sake of service life, the voltage and amperage used on the elements during the course of printing are required to be decreased, the operating time (such as, for example, 0.2 to 4 msec/1 pulse) and the energy to be reduced, and the operating speed is required to be increased. Thus, the elevation of the printing speed constitutes one important requirement.

Since the thermal head is moving toward improvement of quality as described above, effective printing at a low energy level, prevention of the thermal head from deposition of refuse from decomposition or fusion, and prevention of the occurrence of corrosive gases and decaying matter are important requirements in view of elongation of the service life (generally accepted as $10^7$–$10^8$ pulse) of the thermal head.

This invention, in its another desirable aspect, relates to the stencil sheet and film without a supporting member (plane film) which are to be perforated by the heat perforation method using the aforementioned thermal head. When the aforementioned commercially available thermal head is used, the effective perforation required for the purpose of printing can hardly be attained on such stencil sheets as obtained by laminating the conventional films, i.e. crystallized polyethylene terephthalate film about 2 μm in thickness and vinylidene chloride type copolymer film about 7 μm in thickness, on supporting members (thin non-woven or woven fabric). Thus, it is entirely impossible to make any satisfactory printing by using the commercially available thermal head. In the circumstance, the thermal head necessitates modifications tending to increase the energy consumption by the heat generating elements, increase the magnitude of pressure exerted during the course of perforation, and decrease the printing speed, quite contrary to the requirements enumerated above. The efforts made for these modifications are far from those devoted to perfection of a thermal head which produces an image of fine picture elements, ensures an increased printing speed, and warrants enhanced durability.

As regards other known techniques, the specification of Japanese Patent Application Laid-open No. 48398/1985 has a disclosure to the effect that a polyester film not more than 4 μm in thickness is used and this film, to be perforated satisfactorily, is required to be nothing other than a polyethylene terephthalate film 2 μm in thickness (melting point 255° to 260° C.). In the specification of Japanese Patent Application Laid-open No. 48354/1985, the perforation of a stencil sheet using a polyethylene terephthalate film 2 μm in thickness is mentioned. These inventions invariably reside in utility of the aforementioned commercially available highly crystallized polyester films which fall short of the level of perfection. Thus, various efforts are still being continued for development of films of improved quality.

For printing by the method using the heat-sensitive stencil sheet to nature into a new system satisfying a large market, successful development of an especially satisfactory stencil sheet, particularly a stretched film fulfilling the specific requirements described above, is an indispensable requirement.

When the existing commercially available heat-sensitive stencil sheet is perforated with the thermal head of a standard thermal-transfer type small desk-top word processor (for example, Casio-Word HW-120, produced by Casio Computor Co., Ltd.; a device furnished with a printing matrix of 16 dots × 16 dots and designed to operate at a printing speed of 10 letters/second) (with the thermal-transfer tape cassette removed), no sufficient perforation is attained on the stencil sheet using the aforementioned polyethylene terephthalate film 2 μm in thickness and the supporting member even at the highest possible printing energy level. The area of the perforated portion is about 15 to 20% of the part normally expected. The prints obtained by using the prepared stencil sheet are obscured so heavily as to defy deciphering. In the method of plate making by the flash irradiation, the stencil sheet using the vinylidene chloride type copolymer film about 7 μm in thickness enjoys far better perforation property at a low energy level than the aforementioned polyethylene terephthalate film about 2 μm in thickness. When this stencil sheet is perforated by the aforementioned thermal head, it exhibits far poorer perforation property than the stencil sheet using the aforementioned commercially available polyethylene terephthalate film about 2 μm in thickness. The area of the perforated part is only about 2% of the area normally expected. The prints obtained by using the prepared stencil sheet are completely undiscernible. The reason for this phenomenon is not clear. This phenomenon, however, may be presumed that complicated film properties manifest their effects or the increase of film thickness acceleratedly degrades the efficiency of perforation. The word processor mentioned above is furnished with a serial thermal head intended for thermal transfer type and is operated with rather moderate heat energy and pressure. The transfer waxy ink for use with the thermal head is coated on the aforementioned commercially available crystallized polyester tape 3 to 3.5 μm in thickness. The energy used in the thermal head, therefore, is controlled so that the pressure exerted for the perforation in this tape will not cause breakage of the tape. With the word processor of a higher grade offered by Casio and furnished with a printing matrix of 24 dots×24 dots and operated at a printing speed of 20 letters/sec., the stencil sheets using the two aforementioned commercially available films cannot be perforated at all. Since the word processors are moving toward higher operating speed and finer dot elements, the desirability of developing a new film of high performance capable of keeping pace with the rapid growth of the word processors has been expected.

SUMMARY OF THE INVENTION

The present invention provides a highly heat-sensitive film for stencil, comprising a thermoplastic resin having a coefficient of temperature and melt viscosity ($\Delta T/\Delta \log VI$) of not more than 100 and a thermal shrinkage (X%) at 100° C. and a thermal shrinkage stress (Y g/mm$^2$) at 100° C. falling respectively in the ranges of the formulas; $15 \leqq X \leqq 80$ and $75 \leqq Y \leqq 500$; and both falling in the range of the formula; $-8X+400 \leqq Y \leqq -10X+1000$; having a thickness in the range of 0.5 to 15 μm, and excelling in low-energy perforation property and a highly sensitive stencil sheet excellent in low-energy perforation property, which stencil paper comprises a film 0.5 to 15 μm in thickness consisting of a thermoplastic resin having a coefficient of temperature and melt viscosity ($\Delta T/\Delta \log VI$) of not more than 100 and exhibiting a thermal shrinkage factor (X%) at 100° C. and a thermal shrinkage stress (Y g/mm$^2$) respectively falling in the ranges of the formulas; $15 \leqq X \leqq 80$ and $75 \leqq Y \leqq 500$, and both falling in the range of the formula; $-8X+400 \leqq Y \leqq -10X+1000$; and a porous supporting member permitting permeation therethrough of printing ink, avoiding being substantially degenerated under the heating conditions existing during the perforation of said film, and having said film laminated thereon.

The film of this invention is superior in a low temperature perforation property, capable of being perforated with a low energy thermal head or with a low energy flash irradiation for making a plate; expansion of perforations is small when the film is perforated; and its change with time (dimensional change) is small and its sizes are stable.

Figure 2:
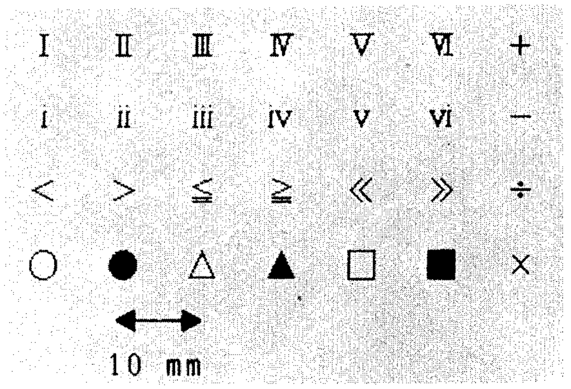
FIG. 2 to FIG. 5 are photographs of printed matters obtained by the aforementioned method after perforating with the aforementioned commercially available word processor.
Figure 3:
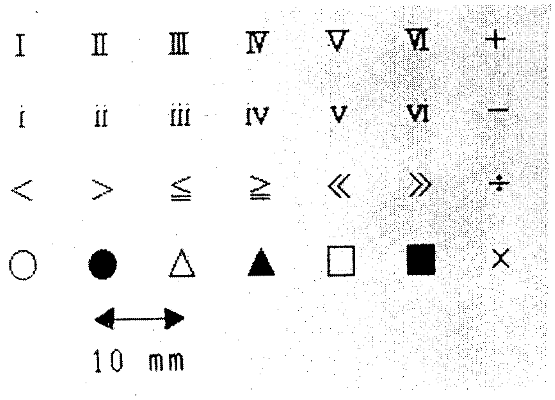
Figure 4:
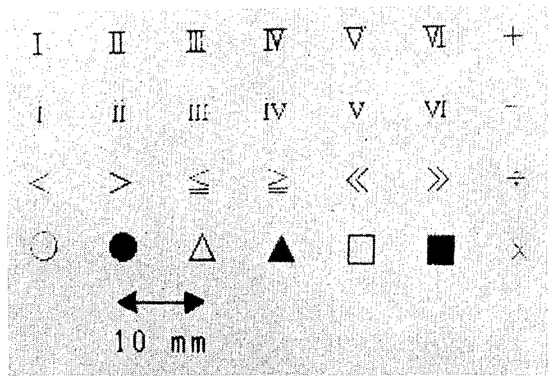
Figure 5:
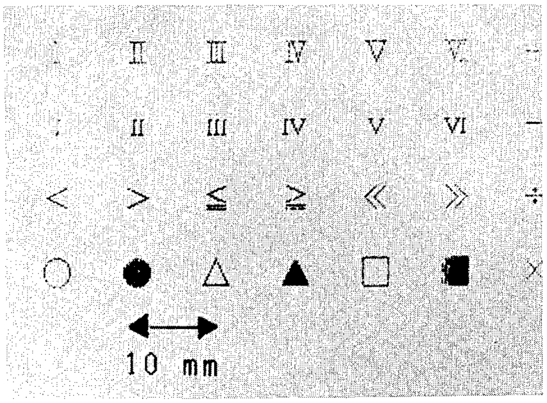

Each stencil sheet made of amorphous copolymerized polyester film has a thickness of 2 μm (Example 1, Run No. 3) in FIG. 2; 5 μm (Example 1, Run No. 4) in FIG. 3; 7 μm (Example 1, Run No. 5) in FIG. 4; and 12 μm (Example 1, Run No. 7) in FIG. 5 (The films 2 μm to 7 μm in thickness are used as bonded to a 150 mesh polyester film with an adhesive and the film 12 μm in thickness is used solely.).

Figure 6:
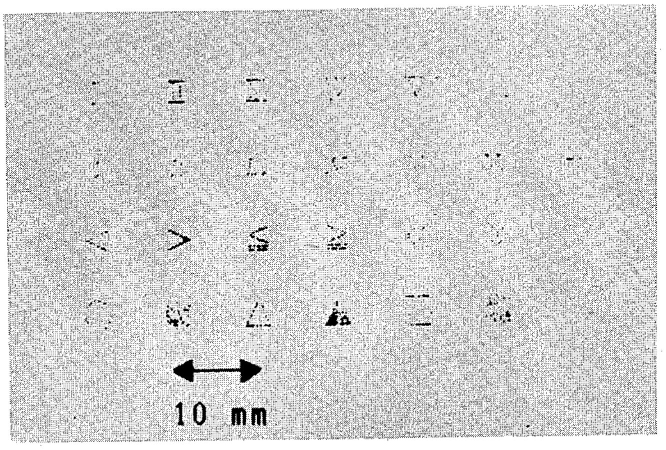

FIG. 6 is a stencil sheet of a commercially available polyethylene terephtharate film 2 μm in thickness (Comparative Sample (a)).

Figure 7:
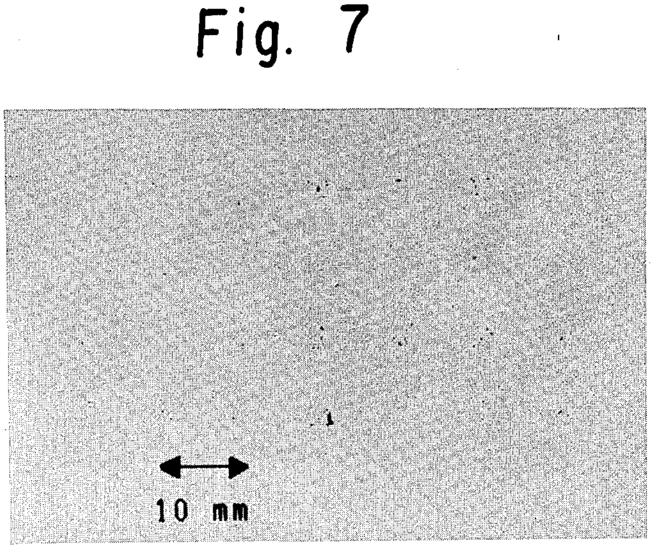

FIG. 7 is a stencil sheet of a commercially available saran film 7 μm in thickness (Comparative Sample (b)).

Figure 8:
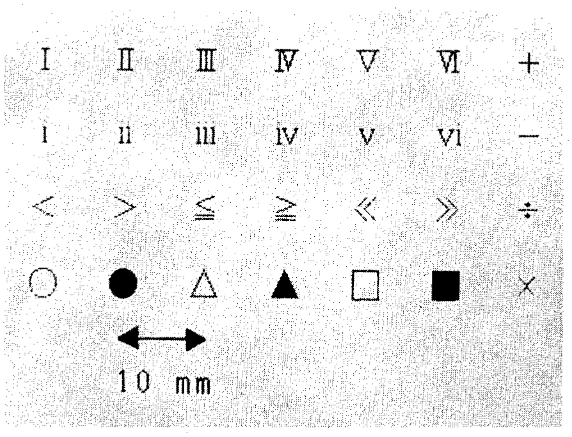

FIG. 8 is a photograph of a printed matter obtained with the above word processor with its original thermal-transfer print cartridge removed.

Figure 9:
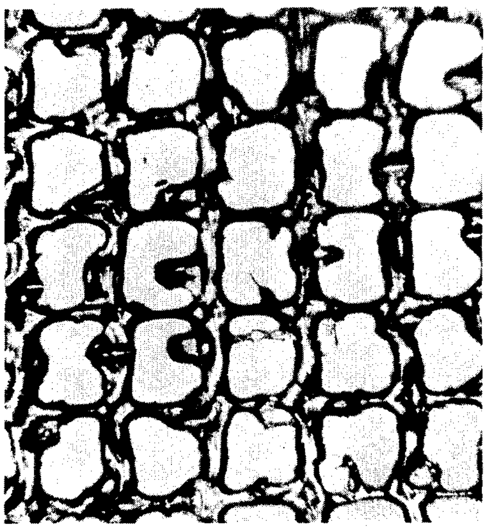

FIG. 9 is a photograph showing enlarged perforations prepared in a film 7 μm in thickness (Example 2, Run No. 5) with the minimum printing output with the above word processor by following the aforementioned procedure.

Figure 10:
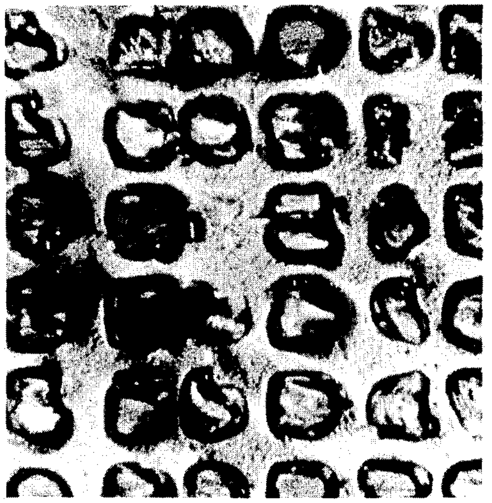

FIG. 10 is a photograph of enlarged perforations prepared in a commercially available 2 μm polyethylene terephthalate film (Comparative Sample (a)) with the maximum printing output by the above procedure.

DETAILED DESCRIPTION OF THE INVENTION

In view of the true state of affairs described above, the inventors pursued a diligent study devoted to perfection of a film excellent in workability and dimensional stability, satisfactorily perforated by the thermal head of a low energy level, and therefore usable as a film for a heat-sensitive stencil film or sheet. They have consequently succeeded in developing a novel film satisfying the aforementioned requirements within the purview of the specific film properties to be described fully afterward and, therefore, usable for the heat-sensitive stencil film or sheet. The printing by the thermal head method is not the only application for which this novel film is intended. Equally in the perforated stencil by the conventional flash irradiation method, the film of this invention manifests its performance satisfactorily. The fact that the film can be perfectly perforated with the flash irradiation of low energy level constitutes itself an immeasurable merit in the light of the problem of undesirable yet inevitable use of an expensive device for perforation, the problem of limited area perforated by one irradiation, the problem of slow speed of perforation, and the problem of insufficient durability and poor safety, as well as the problem of inferior resolving power and low print durability due to damage done to the perforated letters during the separation of the film from the original after perforation or due to the deterioration of film. As compared with the conventional film which does not withstand the treatment at a high energy level as involved in the flash irradiation method or thermal head method because of loss of resolving power and film strength, the film of this invention is free from such drawbacks and is usable in a wide variety of applications. It can be also perforated by the dot irradiation of a laser spot of low energy level. This is an epochal achievement.

This invention, in a further aspect, has accomplished the perforation of a stencil film or sheet especially by the thermal head in the area heretofore unattained by the conventional films. As a result, an entirely novel method of printing can be easily established. This is a plain film which has no use for any supporting member and excels in sensitivity, resolving power, strength, ease of handling, workability, and printing durability (freedom from loss or deformation of perforated letters). For the purpose of comparison, the aforementioned commercially available highly crystallized polyethylene terephthalate films or other films of equivalent degrees of crystallinity (about 45%), having varied thicknesses of 1.5 μm, 2 μm, 4 μm, 6 μm, and 10 μm, were fed into the aforementioned word processor as a thermal head for perforation at a low energy level, with a woven fabric of polyester of 150 mesh simply superposed as a cushion between the thermal head and the platen or with a sponge of platen or retainer base set in place, to print on the film (providing that the cassette holding an inked heat transfer film removed for the convenience of treatment). Then, the film without a supporting member was removed from the thermal head and used for printing copies. The prints produced with the films 1.5 μm and 2 μm in thickness were obscured so heavily that they were undecipherable. In other words, absolutely no sign of effective perforation was found in these films. Absolutely no perforation was attained in the films 4 μm, 6 μm, and 10 μm in thickness. Substantially no effective perforation was attained in the aforementioned stencil sheet of a vinylidene chloride copolymer film 7 μm in thickness.

In the said two type films in large thicknesses advantageous in terms of workability and strength, without reference to the presence or absence of a supporting member, attainment of any effective perforation is next to impossible. An attempt to produce from the conventional film a stencil film of the simplest form using no supporting member and permitting perforation of letters and images in independent discontinuous dots with the thermal head and producing a stencil film or sheet capable of yielding copies of clean prints has been futile.

The inventors have now developed an epochal, high-performance film which can be sufficiently perforated by the aforesaid thermal head in a film thickness of 10 μm, for example, which produces a stencil film or sheet capable of yielding copies of prints of high quality, and which in itself as a film, excels in workability, strength, and printing durability and obviates the necessity for using a supporting member. The merits of this film promise perfection of a system of a novel printer which is inexpensive, simple, and notably compact, capable of continuous printing and low-cost copying.

A film 6 μm in thickness of the above highly crystallized polyethylene terephthalate was perforated at a lower printing speed with a printer possessing a thermal head (16 dots×16 dots) at a high energy level of about 3 times the average. The degree of perforation was about 70% indicating poor state of perforation and refuse remained in a large volume. The portion around the perforated section which had its orientation disappeared and crystallized was more brittle than the film 7 μm in thickness described in Example 1 and when it was repeatedly folded to sharply bent, a crack was formed. When the energy is higher and the film is thicker, the film is cooled as if annealed and, as a result, the fine molten part around the perforated section tends to lose its strength. This phenomenon hardly takes place in the film of amorphous type which is a particularly preferable film of the present invention. Also, the printing durability of this film is excellent. Especially, when a supporting member is not used, the difference in quality between the above film 6 μm in thickness and the film of the present invention is large.

Now, the essential characteristics for the stencil system to be utilized by this invention will be described in detail below.

The most important point in the course of perforation which occupies the most important position in the system under discussion resides in the fact that, first the film to be used should possess ample perforation sensitivity. A careful study on this point reveals that the necessity for the perforation sensitivity arises from the following reason.

Since the printing system contemplated here is printing by stencil, the perforation of the stencil sheet must be effected with the heat radiation of low energy level, the electromagnetic wave transformable into heat, or by the transfer of heat through contact with heat generating elements. This is an eventual goal of the system of interest and results in economization of the perforation system and in development of a total system promising a low energy consumption. As a result, the apparatus required for the system becomes inexpensive. This system promotes enhancement of the printing speed and proves advantageous over the other printing methods.

Then, the system ensures elongation of the service life of the apparatus, is advantageous to the maintenance of the apparatus including not only the heat generating part and the heat radiating part but also the other accessories. For example, the system enables the cycle of perforation, during the course of perforation by the flash irradiation method, to be shortened when one stencil is produced by flashing the stencil sheet through one original while moving this original after each flashing to many different positions of the stencil sheet until the perforation is effected throughout the entire area or when a multiplicity of stencil sheets are to be perforated successively.

In the field of the automatic printing machine, the electrostatic toner method utilizing photo-semiconductors now prevails among the existing copying methods. As compared with this method, the conventional stencil method consumes a very long time in the step for preparing a stencil by perforation. This fact renders production of a small number of copies disadvantageous. Once the stencil is prepared for printing, the step of printing itself proceeds very quickly (about 120 copies per minute). When this method is used for automatic printing of a large number of copies, it proves to be the most inexpensive and advantageous system. This method materializes a small maintenance-free digital printing machine which permits free enlargement or contraction of prints by means of digital signals and obviates the necessity for a lens system and a toner system.

From the standpoint of the stencil film or sheet, the high perforation sensitivity implies a saving of extra energy and promises various advantages such as prevention of the film from fast adherence to the original or the thermal head, prevention of the original from smearing the thermal head, and prevention of the film from deformation. Further, the resolving power which is one of the important characteristics as described fully in the subsequent paragraph can be retained high (as by preventing the perforated film from deformation by heat and preventing the perforation dots in the periphery of a perforated image from being widened). The ease with which the display of shades of a given image is effected can be enhanced. Then, in the perforation by the flash irradiation method, the high perforation sensitivity proves advantageous when the stencil films sheets are treated with an original of light color, namely, of an image drawn with a small amount of ink, a colored original, or an original having an image printed on a sheet of paper of rough and heavy surface irregularities.

Besides, the possibility of the unperforated part of the film or the corresponding part of the supporting member being degenerated by heat can be curbed. As the result, the durability of the stencil sheet during the course of printing can be retained high.

Second, the film to be used is required to possess an amply high resolving power. The resolving power is a characteristic which does not deserve any mention before the stencil sheet is perforated. Generally, because a film has high sensitivity, it does not necessarily follow that the film has a high resolving power. On many occasions, films of high sensitivity turn out to be ones suffering from poor resolving power. That is to say, when the film has high sensitivity, a perforated image comes to be excessively bold on exposure to the heat persisting in the film or other parts of contact, so that the stencil with the above image will produce printed copies of inferior resolution. The absence of this adverse phenomenon constitutes itself an important factor for the clarity of prints obtained in the produced copies. When small dots and lines forming an image are suffered to overlap or continue into one another, the produced prints are deprived of their value.

When a film is bonded to a supporting member, the supporting member serves to prevent the perforated dots and lines from being widened during the course of perforation. This effect of the supporting member hinges heavily on the basic properties of the film itself, although it is more or less affected by the kind of the supporting member, the method of bonding, the kind and the amount of adhesive to be used, the amount of energy exerted during the course of perforation, the kind of an original used for the perforation, and the fastness of contact (pressure used). Thus, the present invention has one feature on this particular point.

Third, when the film is used as laminated on a supporting member, the film is required to excel in adaptability to tha lamination (workability, resistance to solvent, resistance to heat for drying, strength, and adhesiveness) and suffers from minimum loss of sensitivity on contact with the adhesive.

Fourth, it is important that the film should not be deteriorated or shrunken by the solvent contained in the ink.

Fifth, the film should possess modulus and strength nerve enough to avoid being broken, snapped, or wrinkled when it is laminated on the supporting member. The modulus and strength nerve are particularly important when the film is used without a supporting member.

Sixth, the film should excel in abrasion resistance enough to withstand the impact exerted during the course of printing.

Seventh, the film should enjoy high dimensional stability enough to avoid being shrunken during storage or during the course of perforation.

Eighth, it is naturally important that the film should be produced easily and offered at a reasonable low price.

To give the first priority to sensitivity and resolving power, the film is produced in an extremely small thickness (to the order of about 2 μm in the case of the commercially available stretched crystallized polyethylene terephthalate film) at a sacrifice of other factors. In this case, owing to the adverse phenomena (rupture, uneven wall thickness, etc.) encountered during the course of production or the decline of output, the fixed cost is extremely increased. Further, the enhancement of precision in the production results in an increase of the cost of equipment.

The film of this invention, to be used, requires as a heat source a suitable light source such as a halogen lamp, a xenon lamp, a crypton lamp, a flash lamp, or a laser beam. The perforation of the film is effected by utilizing the energy of the visible part or the infrared part of the electromagnetic wave. Particularly desirably, the film for the perforation may rely on the heat transferred from the extremely small heat generating elements as in the thermal head. In this case, the use of the specific film described below has succeeded in providing decidedly high degrees of heat-sensitive perforation sensitivity and resolving power heretofore never attained in the art.

The inventors continued a study in search of a thermoplastic resin film suitable for a heat-sensitive stencil film or sheet. As a result, they have uncovered the following important fact which has hardly attracted any serious concern to date.

For any thermoplastic resin film to be effectively used in heat-sensitive stencil film or sheet, it must be subjected to a stretching treatment by all means. First, the low-temperature shrink characteristic of the film is important. It has been found that the low-energy perforation property (perforation sensitivity) increases in proportion as the aforementioned characteristic is improved. The film which excels in low-energy perforation property and resolving power is now desired to possess a Vicat softening point in the range of 40° C. to 200° C. as determined by the ASTM-D1525 method (under a load of 1 kg at a temperature increasing rate of 2° C./min.) Desirably, this resin is (1) an amorphous resin, (2) a resin of a low degree of crystallinity, or (3) a crystalline resin having a relatively low melting point (for example, in the range of 60° C. to 200° C.) despite a relatively high degree of crystallinity (as 30% or over). It has been found that (4) even in the case of a resin having a high crystal melting point and/or a high degree of crystallinity, the resin can be used when the degree of crystallinity is lowered and retained stably at the lowered level and the specific properties to be described fully afterward are imparted by adjustment of the film molding conditions. The most advantageous resin is that of (1), followed by (2), (3), and (4) in order.

Further, to be used for the film of this invention, the thermoplastic resin is required to have a large temperature dependency of the melt viscosity (VI) in a specific range, namely a lower coefficient of temperature and melt viscosity, $\Delta T/\Delta \log VI$. One possible reason for this requirement is that, for the purpose of obtaining a stencil of high resolving power (sharpness of edges of perforations and prevention of perforations from expansion), the part of the resin melted and softened by heating is perforated in a form shrunken and fluidified as accurately conforming to the heated part (or image part) and, immediately thereafter, the edges of perforations must be quenched and solidified. Another possible reason is that, for the purpose of enabling the perforation to proceed stably within a very short span of time in a wide range of temperature (due to the applied energy) delicately varying along the course of time, the aforementioned sharpness of the fluidity characteristic is an important factor and it also affects the perforation sensitivity.

From the various observations, it has been found that the film of this invention for the stencil film or sheet capable of being perforated with a heat source of low energy level is required to satisfy the melt viscosity condition to be described fully afterward without reference to the kind of the thermoplastic resin and, then, of the shrink characteristics expressed by thermal shrinkage and thermal shrinkage stress, those at low temperatures (specifically at 100° C.) should fall within a specific range.

In other words, studies have been heretofore conducted severally on different resins with respect to perforation property of film. In the present invention, a film for a stencil sheet of excellent low-energy perforation property can be obtained irrespectively of the kind of the thermoplastic resin to be used, so long as the shrink characteristics of the film and the melt viscosity of the thermoplastic resin fall in the aforementioned specific ranges.

To be specific, as already pointed out, the stencil sheets using the commercially available polyethylene terephthalate film about 2 μm in thickness and the similarly available vinylidene chloride type copolymer film about 7 μm in thickness (which far excels the above polyethylene terephthalate film in terms of perforation sensitivity in the flash irradiation method) cannot be sufficiently perforated by the thermal head of the desktop heat transfer type word processor described above. Surprisingly, it has been demonstrated that the stencil film or sheet using the film of this invention having a larger thickness can be perforated not only by the flash irradiation especially at a low energy level but also by the aforementioned thermal head of a low energy level, to yield amply clear printed copies.

Now, the present invention will be described in detail below.

The term "coefficient of temperature and melt viscosity" as used herein with respect to the thermoplastic resin for use in the film of the present invention refers to the change of temperature, $\Delta T/\Delta$ log VI (°C.) which occurs when the absolute value, logarithm of the melt viscosity VI (poise) of the resin under the condition of a shear rate of 6.08 $sec^{-1}$ varies from 4.0 to 5.0. This invention defines this value to be not more than 100, preferably not more than 80, more preferably not more than 70, particularly preferably not more than 60, most preferably not more than 50 (the unit of this magnitude is omitted where this property is represented as "coefficient"). The upper limit of this property is defined by the fluidity needed at the time of perforation or the processability of the film so as to provide sharp perforations. Although the lower limit of this property by nature depends on the molecular structure of various polymers and also on the degree of polymerization, it is fixed at the level above which the workability of the film (extrudability, stretchability, etc.) is not impaired and the film practically withstands the impact of lamination, perforation, and printing and below which the resin is brittle because of low molecular weight. The lower limit is 3, desirably 5, and more desirably 10. Hereinafter, the coefficient of temperature and melt viscosity will be expressed as $\Delta T/\Delta$ log VI, in accordance with the foregoing definition. This property contributes to conferring enhanced sensitivity and improved resolving power upon the stencil film or sheet using the film. Particularly, for the prevention of perforations from expansion, immediately after the part melted and softened by heating is shrunken and perforated, the edges of perforations are required to be cooled and quickly solidified and consequently stabilized to resist the force of shrinkage. In short, the exactness with which the perforations formed agree with the original and the dotted part of the thermal head during the plate making by the flash irradiation seems to increase in proportion as the temperature dependency of the melt viscosity increases. The characteristic mentioned above is considered to constitute one of the essential requirements for the improvement of perforation sensitivity and for the stabilization of performance with high sensitivity in a wide range of temperatures (energy exerted) which delicately change in a very short span of time.

For the resin to give log VI=5.0 under the aforementioned condition, the temperature used for the measurement is required to fall in the range of 90° to 300° C., desirably 120° to 280° C., and more desirably 150° to 270° C. The lower limit of this range is fixed for the sake of the dimensional stability, freedom from noise during perforation, and resolving power of the film and the upper limit for the sake of the low-energy perforation property.

To be specific, the measurement is effected by the method to be described fully afterward. Of course, the thermoplastic resin to be used for the film of the present invention is required to exhibit the film shrink characteristic to be described afterward. The thermoplastic resin which is notably deficient in film-forming property and film strength is excluded. Although the aforementioned melt viscosity characteristic of the resin is basically a quality inherent in the resin, it may vary to the extent that the perforation characteristic and other practical characteristics are not adversely affected. In other words, this characteristic may be of the value arising after the resin has been admixed with other resin, additives, plasticizer, oligomer, etc. or after the resin has reacted with such additional components.

In order that the thermoplastic resin to be used for the film of the present invention may retain the aforementioned resolving power and perforation sensitivity in particular, the Vicat softening point (hereinafter abbreviated as "VSP") which is affected by the degree of crystallinity, the melting point, the glass transition point, other polymer and additives to be incorporated, etc. is desired to fall in the range of 40° C. to 200° C., desirably 50° C. to 170° C., and more desirably 55° C. to 150° C. in the finally prepared composition. Preferably, the VSP falls in the range of 60° C. to 140° C., and more preferably 60° C. to 130° C. In the case of a resin which is amorphous, this value is constant irrespectively of the method adopted for the determination. In the case of a resin which is crystalline, the value of this VSP arising after the degree of crystallinity has been regulated by the method of molding, the after-treatment, etc. is required to fall in the aforementioned range. In the case of a film, the determination of this value is effected by using a prescribed test piece of the film possessing the equivalent degree of crystallinity in the place of the resin.

The reason for the upper limit of the aforementioned range of VSP is that beyond this upper limit, the temperature for the conversion of the resin to the film (particularly the stretching) is increased and, when the degree of crystallinity is richly increased and the resistance to heat is generously enhanced by the after-treatment, for example, it eventually becomes difficult to confer the film shrinking property and the low-energy perforation property is lowered and the workability is impaired. The reason for the lower limit is that below this limit, the dimensional stability, the characteristics susceptible to aging, and the resolving power are adversely affected and further, during the course of production of the stencil sheet, the problem of deformation and fusion of the film during the contact with the original and the thermal head manifests conspicuously and the resolving power is degraded.

As to the polymer mainly used, a glass transition point (hereinafter abbreviated as Tg) which constitutes the main peak of the molecular structure of the polymer is not less than −20° C., preferably not less than 0° C., more preferably not less than 20° C., further preferably not less than 30° C., particularly preferably not less than 40° C., and most preferably not less than 50° C.

When the end composition to be used is consisting of a polymer having the above VSP at a low level, for example 40° to 70° C., the principle polymer has a Tg of at least 20° C., preferably not less than 30° C., more preferably not less than 40° C., particularly preferably not less than 50° C., and most preferably not less than 60° C. These facts are substantially applicable to the aforementioned both methods of producing the stencil film or sheet.

Now, concrete examples of the thermoplastic resin satisfying the conditions such as the aforementioned coefficient of temperature and melt viscosity and, therefore, proving desirable as the raw material will be cited. First, the polyester type resins as the first group of such examples include polyethylene terephthalate, polybutylene terephthalate, and although not particularly defined, modified copolymerized polyethylene terephthalates [such as those containing, as a diol component, not more than 15 mol%, preferably not more than 10 mol%, of at least one diol selected from the group consisting of propylene glycol, 1,4-butane diol, 1,5-pentane diol, 1,6-hexane diol, neo-pentyl glycol, polyethylene glycol, polytetramethylene glycol, cyclohexane dimethanol as well as ethylene glycol and other known diols or other component having any of the diols enumerated above as a base or having, as a dicarboxylic acid component, not more than 15 mol%, preferably not more than 10 mol%, of at least one acid selected from the group consisting of terephthalic acid, isophthalic acid, phthalic acid, succinic acid, and adipic acid and other similar aliphatic dicarboxylic acids or other component having any of the acids enumerated above as a base [(a minor portion of modifier formed by copolymerization)]. Then, various copolymerized polyesters (having copolymerized with at least one monomer at least one of the aforementioned and other known alcohols or acids or both simultaneously in a ratio of not less than 10 mol%, desirably not less than 15 mol%, and more desirably not less than 20 mol% and not more than 85 mol%, desirably not more than 80 mol%, more desirably not more than 60 mol%, still more desirably not more than 50 mol%, and most desirably not more than 40 mol% and having a desired nature positively conferred thereon beyond the aforementioned portion of modifier) are the second group of such examples. Among the above examples, the copolymers and preferably the copolymers of the second group prove particularly desirable. Substantially amorphous polyester resins are the most desirable selections. Further, polymers and copolymers produced from oxy acid type monomers and copolymers obtained by having these polymers and copolymers copolymerized with the polyesters produced from the aforementioned monomers are also usable.

The substantially amorphous polyester used for the heat-sensitive film of the present invention is a film having as its main component the so-called highly crystallized polyethylene terephthalate currently available in the market and having a crystal melting point (as measured by the DSC method) in the range of 245° to 260° C. It is substantially different from those disclosed in the prior publications cited above. The substantially amorphous level is such that in the form of a polymer consisting of a monomer therefor and an additional component or a blended composition consisting of polymers, the degree of crystallinity determined by the density method using as the standard a sample amply annealed to the state of equilibrium and having the degree of crystallinity clearly established by the X-ray method is not more than 10%, preferably not more than 5%. More preferably this level is such that the polymer or blended composition shows substantially no discernible melting point as measured even by the DSC method (with the temperature increasing rate fixed at 10° C./min.). For the sake of simplicity, the aforementioned degree of crystallinity may be determined by testing the aforementioned sample of established degree of crystallinity for melting point by the DSC method and comparing the area of solution energy of a given sample separately determined with that of the standard sample.

Now, the substantially amorphous polyester most desirably used for the present invention will be described in detail below with respect to the monomer forming that polymer. As the acid component, at least one acid component selected from the group consisting of terephthalic acid and isomers thereof and derivatives thereof and aliphatic dicarboxylic acids and derivatives thereof is utilized. As the glycol (alcohol) component, at least one glycol component selected from the group consisting of ethylene glycol and derivatives thereof (such as polyethylene glycol), alkylene glycols (such as trimethylene glycol, tetramethylene glycol, and hexamethylene glycol), and aliphatic saturated cyclic glycols (such as cyclohexane diol, cyclohexane dimethanol, and cyclohexane dialkylols) is utilized. The essential point is that the combination of two such components to be selected should give a substantially amorphous polymer defined above. Optionally, some other component may be incorporated in such an amount that the produced polyester will satisfy the definition mentioned above. Desirably, the polyester has at least the alcohol component of the two components copolymerized therein. The ratio of this copolymerization is on the same level as that of the aforementioned copolymerized polyester. In a desirable combination, terephthalic acid is selected mainly as the acid component and, as occasion demands, an isomer thereof (isophthalic acid or phthalic acid) may be incorporated therein in a small amount (not more than 15 mol%). As the alcohol component, a mixed component mainly of ethylene glycol and cyclohexane dimethanol is used.

In a more desirable combination, terephthalic acid is selected mainly as the acid component as in the preceding case, a mixed component mainly of ethylene glycol and 1,4-cyclohexane dimethanol is selected mainly as the alcohol component, and the ratio of the above two members of the copolymerized alcohol component is 60 to 80 mol% of ethylene glycol to 40 to 20 mol% of 1,4-cyclohexane dimethanol, preferably 64 to 75 mol% of the former to 36 to 25 mol% of the latter. More preferably, this ratio is 67 to 73 mol% of the former to 33 to 27 mol% of the latter.

The polymerization degree of the copolymer, as expressed by the limiting viscosity number (as measured in a 60/40 wt% mixture of phenol/tetrachloroethane at 30° C.) is in the range of about 0.50 to 1.2, desirably 0.60 to 1.0, and more desirably 0.60 to 0.90. This polymerization degree applies to the homo- and co-polymer of the aforementioned polyester. Below this lower limit, the film shows insufficient extrusion, molding stability, and strength and does not stretch easily. Above the upper limit, the film is deficient in extrusion moldability. This upper limit is also determined in view of the upper limit of $\Delta T\Delta$ log VI. When the aforementioned homopolyester or desirably the copolymerized polyester is used as admixed with other polyester or some other mixable polymer, the proportion of such additional polymer is not more than 50% by weight, desirably not more than 40% by weight, and more desirably not more than 30% by weight. Such additional polymers may be used to the extent that the nature of the produced film of this invention will not be impaired.

The specific copolymer desirably used in the present invention may incorporate therein, as occasion demands, a known stabilizer to resist heat or ultraviolet ray, a slidant, an antiblocking agent, an antistatic agent, a pigment, or a dye to the extent that the production of the film will not be obstructed.

The density of the film which is produced from the aforementioned polyester and then stretched is variable depending on the property of monomer used. In the case of a polyester, including those possessing crystallinity, using in its composition ethylene glycol of this invention as a major component or as a sole component, the density of the film is approximately in the range of 1.200 to 1.345 (g/cm$^3$), preferably 1.220 to 1.320 (g/cm$^3$). When the polyester is admixed with other polyester or other resin, this range of density does not always apply. The range mentioned above applies to the polymer component as the basal part of the mixture.

The polyester resin to be used as the raw material in the present invention is desired to belong to the group of polyester resins satisfying the absolute degree of crystallinity (namely in the amply annealed equilibrium state) defined above. A polyester resin of the following description may be used as occasion permit. This polyester resin may possess, as the absolute value for a raw material, a degree of crystallinity exceeding the foregoing range (namely above the upper limit of 10%) on the condition that the film of this resin will be prepared under the conditions incapable of amply promoting crystallization, e.g. by being suddenly cooled and immediately stretched at the lowest possible temperature, and therefore allowed to acquire a degree of crystallinity of not more than 10% and put to use stably. In this case, the aforementioned range applies to the resin in its final form of a film.

Then, a polyester resin which has a degree of crystallinity exceeding the upper limit mentioned above and also has a high melting point approximating the maximum allowable level of 260° C., for example, can be used on the condition that the film produced from the resin acquires a medium degree of crystallinity (5 to 30%). Naturally, this low-crystallinity film is required to satisfy the film properties to be described below. In this case, the desirable degree of crystallinity of the film is in the range of 5 to 25%, preferably 5 to 20%, and more preferably 5 to 15%. The range above the upper limit is not desirable because of deviation from the range of this invention in view of the property values to be described afterward.

A polyester resin which has a degree of crystallinity lower than the lower limit of the aforementioned range or higher than the upper limit of the range (above 30%, for example) can be used on the condition that it possesses a relatively low melting point (as determined under the aforementioned conditions of the DSC method) falling in the following specific range. This range is 60° C. to 200° C., preferably 70° C. to 180° C., and more preferably 70° C. to 150° C. The lower limit of this range is fixed for the sake of dimensional stability and freedom from expansion of perforations and the upper limit for the sake of heat-sensitive perforation sensitivity. After all, from the standpoint of the finally produced film, the most desirable choice is a substantially amorphous film obtained from a substantially amorphous resin. The next best choice is a substantially amorphous film or a low-crystallinity film produced from a raw material of a low degree of crystallinity. The former is preferred over the latter. The next choice is a substantially amorphous film or a low-crystallinity film produced from a raw material of a low melting point, and the former is preferred over the latter. The subsequent choice is a substantially amorphous film or a low-crystallinity film produced from a raw material of a high degree of crystallinity, and the former is preferred over the latter. The reason for this definition is that the film, during the heating for perforation and especially prior to the perforation, possibly undergoes crystallization or degradation or displays undesirable behavior. Although the reason for this phenomenon is not clear yet, it brings about a delicate effect. The film produced from a polymer which is easily crystallized and highly crystallized has a tendency that the strength of the section melted after the perforation is largely lowered due to the crystallization and, therefore, is not desirable in view of the printing durability.

Now, the use of polymers other than the polyester type polymers will be described below. The polyamide type resins include nylon-6, 66, 12, 6-10, 6-12, and other known forms of polyamide. Desirably, they are copolymers. These copolymers are binary, ternary, and higher copolymers. For example, copolymers obtained by subjecting caprolactam type monomers to ring-opening polymerization, copolymers obtained by polycondensation of dicarboxylic acid components and diamine components, and copolymers obtained by copolymerizing such copolymers have been known to the art, and they are all used. Desirable examples are copolymers of nylon 6-66 and copolymers obtained by copolymerizing the nylon 6-66 copolymers with terephthalic acid possessing an aromatic ring. Among the copolymers enumerated above, those which have, as a rigid part in the molecular structure, 1 to 50 mol%, desirably 2 to 30 mol%, more desirably 3 to 20 mol%, and most desirably 3 to 15 mol%, of a monomer containing a richly branched hydrocarbon component, a saturated cyclic component, or an aromatic ring copolymerized thereof so as to rigidify the molecular structure and enriched the amorphous component without lowering Tg prove particularly desirable. The desirable Tg is generally in the range of 20° C. to 150° C., preferably 40° C. to 150° C., more preferably 45° C. to 130° C., still more preferably 50° C. to 110° C., and most desirably 60° C. to 100° C. The degree of crystallinity is desired to be as low as possible so as to approximate the amorphous level. The upper limit of the degree of crystallinity is 30% desirably 20%, and more desirably 15%. Then, the Tg, the degree of crystallinity, the crystal melting point, the other polymers allowed to be incorporated, the additives, and the Vicat softening point (under the aforementioned measuring conditions) which eventually affects the finally prepared composition are the same as those already defined for the polyesters above. The melting point of the polyamide polymers is the same as that for the aforementioned polyesters. Similarly to the polyesters, the most desirable polyamide polymers are copolymers which are substantially amorphous, satisfy the aforementioned characteristics, and fulfil the shrink characteristic to be described afterward. When the polyamide polymer incorporates therein a compatible polymer, the proportion of the added polymer is not more than 50% by weight, desirably not more than 40% by weight, and more desirably not more than 30% by weight.

The polycarbonate type resin is desirable due to its strong toughness but the carbonate ester type resin with bisphenol A at present has an excessively rigid and straight molecule and, therefore, although it is amorphous, the Tg is as high as 150° C. and its heat resistance is too high. Consequently, it is not very preferable. In the place of the bisphenol A, if available, it is desirable to use the resin having a little softer segment within its molelcule or a new resin such as a copolymerized one. The Tg is preferable to be not more than 130° C., more preferably not more than 100° C., and still preferably not more than 90° C. The lower limit is 40° C.

Some other thermoplastic resin may be used on the condition that it is allowed by varying the degree of polymerization or the copolymer composition to satisfy the aforementioned conditions. Among the thermoplastic resins acceptable for use as described above, those which are copolymers prove particularly desirable. The copolymers include styrene type copolymers, acryl type copolymers, ethylene-vinyl alcohol type copolymers, and ethylene type copolymers. Among the copolymers cited above, those which are substantially amorphous prove particularly desirable. A mixture of two or more of the resins enumerated above can be used. The characteristics of this mixture have only to be such that the average characteristic constants will fall in the defined ranges. A polymer containing chlorine and easily decomposable at a relatively low temperature is not preferable. A polymer containing a large amount of plasticizer is not preferable either.

The crystalline resins of the group other than the aforementioned groups of polyester type and polyamide type resins are desirably subject to the same restrictions as those imposed on the polyester type and polyamide type resins. The amorphous resins are selected on the condition that they satisfy the aforementioned restriction on the Vicat softening point.

As a tendency common to all the resins, the perforation is affected by complicated factors arising from various characteristics. Although no general statement is acceptable, it is safe to conclude that a resin accepted for is excellent sensitivity and resolving power is found to satisfy the aforementioned characteristics and the film characteristics to be described fully afterward. Among the polymers, specific copolymers which are substantially amorphous or nearly so prove particularly desirable. As clearly shown in the comparative examples cited afterward, the aforementioned commercially available highly crystallized polyester 2 μm in thickness (degree of crystallinity 45% and mp 256° C.) equals to the flash irradiation grade film of Example 1 of this invention having a thickness of about 16 μm (in terms of energy and perforation property) or to the thermal head grade film having a thickness of about 17 μm. This statement is based on the results of the perforation at low energy level. In terms of the amount of heat consumed up to the step of melting and in due consideration of the energy for the fusion of crystals and the thickness of film, the values found for the films under discussion differ so widely as to admit of an inference that the films of the present invention have totally unexpected special effects. Although the reason for this phenomenon is not known yet, the phenomenon may be logically explained by postulating that the films have certain effects of enabling the films of this invention to become particularly sensitive to the radiation given for an extremely short period of 1/1,000 second, for example. There is a fair possibility that a crystalline film, for the purpose of perforation, requires a retention time before crystals are melted, for example. This retention time may manifest itself in the form of a logarithmic difference relative to temperature. The films of this invention are believed to possess effects which have escaped due attention. The methods heretofore known to the art teach virtually no idea of pointing out or anticipating such effects. The film of this invention is the first to imply the presence of these effects. The film attains these composite and synergistic effects solely by satisfying the characteristics of melt viscosity and shrinkage in particular and the other characteristics mentioned in the specification as well.

With respect to a film possessing crystals, details are not known but it is presumed that depending on the kind of crystals, namely the difference of the crystalline structure the kinds of polymer related, the melting state in a short span of time as described above is supposed to be different, and the fusion energy is also different. It is also presumed that the film has a crosslinking structure for a fixed span of time until melting takes place, the degrees of entanglement of molecules are different, and the flowing is prevented (≈perforation is prevented). Between the same degree of crystallization, the perforation property of the olefine type resin is generally inferior to that of the polyester type resin.

Now, the characteristics of the film of this invention will be described below. For the perforation to be favorably carried out with a heat source of a low energy level, it is necessary in the first place that the film should manifest a thermal shrinkage characteristic in a prescribed low temperature range. As the criterion for the evaluation of the low-temperature shrinkage characteristic, this invention adopts the thermal shrinkage factor (=thermal shrinkage) and the thermal shrinkage stress both at 100° C. and defines proper ranges therefor. Specifically, the thermal shrinkage is at least 15%, desirably at least 20%, more desirably at least 30%, and most desirably at least 40%. The upper limit of this property is 80%. The reason for the range will be described afterward. The thermal shrinkage stress (Y) is at least 75 g/mm², desirably not less than 100 g/mm², and more desirably 150 g/mm². The upper limit of this property is 500 g/mm², preferably not more than 450 g/mm².

Figure 1:
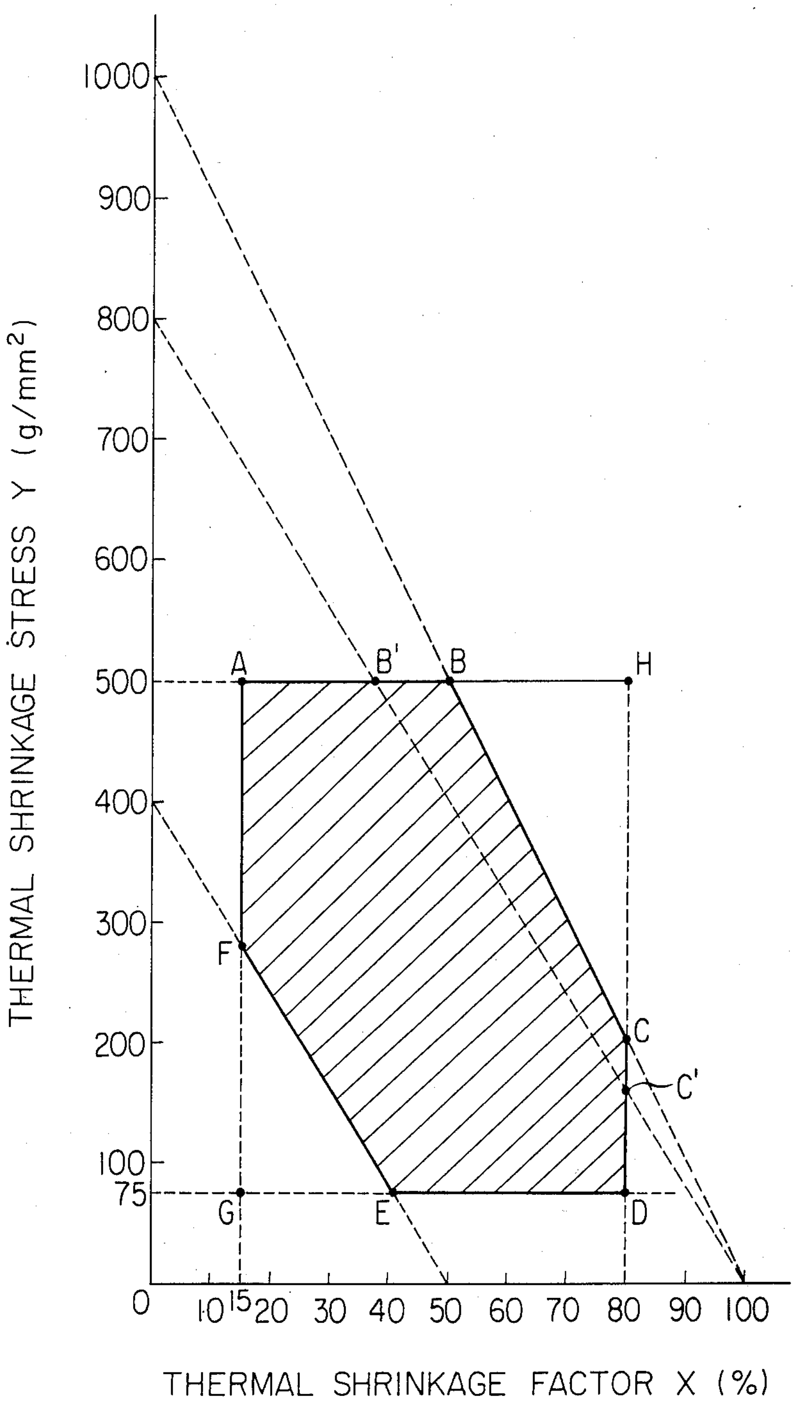
FIG. 1 is a view showing the relation between the thermal shrinkage factor X in % at 100° C. and thermal shrinkage stress Y in g/mm$^2$. Segment $\overline{AB}$ is expressed as $Y=500$, segment $\overline{BC}$ is expressed as $Y=-10X+1000$, segment $\overline{B'C'}$, which represents a preferred range, is expressed as $Y=-8X+800$, segment $\overline{CD}$ is expressed as $X=80$, segment $\overline{DE}$ is expressed as $Y=75$, segment $\overline{EF}$ is expressed as $Y=-8X+400$, segment $\overline{FA}$ is expressed as $X=15$. The scope according to the invention corresponds to a hexagonal area ABCDEF which is expressed by the above formula of the segments. A preferred range is an area AB'C'DEF. Point G in the Figure is an intersection between lines $X=15$ and $Y=75$. Point H is an intersection between lines $X=80$ and $Y=500$.

Now, the two properties will be described more specifically below with reference to the accompanying drawings. The range of characteristics of the thermoplastic film of the present invention will be described with respect to the relation between the thermal shrinkage (X%) and the thermal shrinkage stress (Y g/mm²) shown in FIG. 1. The thermal shrinkage as used herein refers to the value determined at 100° C. and the thermal shrinkage stress similarly refers to the value determined at 100° C. In FIG. 1, the straight line $\overline{BC}$ is expressed by the formula, $Y=-10X+1{,}000$, preferably the straight line $\overline{B'C'}$ by the formula, $Y=-8X+800$, and the straight line $\overline{EF}$ by the formula, $Y=-8X+400$. Further, the thermal shrinkage, X, is defined by the formula, $15 \leq X \leq 80$ and the thermal shrinkage stress, Y, by the formula, $75 \leq Y \leq 500$. It follows, therefore, that the characteristics of the thermoplastic resin film of this invention fall in the hatched region of a hexagon ABCDEF of FIG. 1. The reason for the limitation of the characteristics to the specific region is given below. In the region of $X<15$ in FIG. 1, the perforation property tends to be impaired as the thermal shrinkage stress decreases and the expandability of perforations tends to increase as the thermal shrinkage stress increases. In the region of $Y<75$, the film mainly suffers from lowered low-temperature shrinkage characteristic and impaired perforation quality. Then, in the region of $X \geq 15$, $Y \geq 75$, and $Y<-8X+400$, namely in the region of a triangle EFG, the shrinkage characteristics fall in a high-temperature part and the film is not perforated by a heat source of a low energy level, the film is perforated by a heat source of a low energy level and the perforations formed assume the pattern of a rattan blind instead of a perfect shape aimed at, or the film has perforations of dull edges liable to keep hold of remnants of perforation. Further, in the region of $X>80$ and $Y>75$, or in the region of $Y>500$ and $X>15$, or in the region of $X \leq 80$, $Y \leq 500$, and $Y>-10X+1{,}000$ represented by a triangle BCH, the film has satisfactory low-energy perforation property and tends to have expanded perforations and poor processibility.

As regards the shrink characteristic at low temperatures, the definition of the desirable shrinkage characteristic at 80° C. is that the thermal shrinkage at 80° C. is at least 10%, desirably not less than 15%, more desirably not less than 20%, and most desirably not less than 30% and the thermal shrinkage stress is at least 50 g/mm², desirably not less than 100 g/mm², and more desirably not less than 150 g/mm². Now, the other necessary characteristics which the thermoplastic resin film of the present invention should satisfy will be described below.

First, the film for use in the stencil film or sheet of this invention is required to have satisfactory dimensional stability. Otherwise, there ensues a practical problem that the stencil sheet curls and the supporting member separates and the letters formed by perforation in the stencil sheet deform. In the case of a commercially available vinylidene chloride type copolymer film 7 μm in thickness, for example, even when a stencil sheet is produced by stretching the film and thermally setting the stretched film within the range of retaining the perforation property (at 110° C. for 20 seconds, for example) thereby lowering the shrinkage as described above, and bonding the resulting film to a supporting member, the stencil sheet entails a practical problem that, during a protracted storage at room temperature, the stencil sheet curls and the supporting member separates from the film and the stencil sheet suffers from impaired resolving power.

In contrast, the thermoplastic resin film which constitutes the stencil film or sheet of this invention is required to possess high dimensional stability at room temperature such that it does not easily entail any appreciable shrinkage even when it is treated in a hot air circulation constant temperature bath at 50° C. for 10 minutes. In the shrinkage characteristics of the film, the temperature for starting substantial shrinkage of 2 to 3% is desired to be not less than 50° C., desirably not less than 55° C., and more desirably not less than 60° C. The lower limit of this temperature is fixed for the sake of dimensional stability, lamination workability and freedom of perforations from expansion.

Then, the peak value of the shrinkage stress has an effect on the perforation sensitivity which is essential to the accomplishment of the objects of this invention. The peak falls in the range of 100 to 1,200 g/mm², desirably 150 to 1,000 g/mm², more desirably 200 to 900 g/mm², and most desirably 250 to 800 g/mm². The upper limit of this range is fixed for the sake of freedom of perforations from expansion and the lower limit for the sake of prevention of perforation sensitivity from degradation.

Now, the temperature for the peak of the aforementioned shrinkage stress is in the range of 70° C. to 150° C., desirably 80° C. to 140° C., and more desirably 80° C. to 130° C. The upper limit of this range is fixed for the sake of preventing the perforation sensitivity from falling and keeping the perforations from expansion and the lower limit for the sake of ensuring dimensional stability and keeping the perforations from expansion.

The proper thickness of the film of this invention is in the range of 0.5 to 15 μm. When the film is superposed on a supporting member to withstand perforation by the flash irradiation method, this range falls in the range of 1 to 7 μm, preferably 1 to 6 μm. When the film for the stencil sheet is used as laminated on a supporting member for perforation by the use of a thermal head, this range is 1 to 7 μm, preferably 1 to 6 μm, more desirably 1.5 to 5 μm, and most desirably 2 to 4 μm. When the film without the supporting member for the stencil film is used for perforation formed with dots, this range is 5 to 15 μm, desirably 6 to 13 μm, and more desirably 8 to 12 μm, in due consideration of workability, ease of handling, strength, and strength of remaining polymer section between each perforation.

When a more sensitive and sharp image is needed, the former thin film is used as laminated on a supporting member. In the film of this invention, the effect of the perforation sensitivity exerted on the heat capacity of the film is decisively small as compared with the other films. If the thickness of the film is excessive, the thermal capacity manifests its effect and the resolving power and similar properties are adversely affected. The excessive thickness of the film further entails a problem of expanded perforations and loss of surface flatness due to perforation (separation of film from the supporting member) and a problem of remnants resulting from perforation of film (particularly in the light of the fact that, during the perforation by a thermal head, the film which melts and shrinks causes the remnants to adhere to and set on the edges of perforations and the supporting member). The upper limit mentioned above, therefore, is fixed for the sake of precluding these problems. The thickness of the stencil film or sheet has a fixed lower limit for the sake of ensuring workability (such as stretching, winding, and superposition) and enabling the film to enjoy high printability and strength enough to permit easy handling.

In all the methods available for perforation, that which uses a thermal head proves particularly desirable. When this particular method is adopted, the desirable film thickness is different between the two methods as described above. The aforementioned characteristics are desired, within their respective ranges, to fall on the sides favoring high film sensitivity. By reason of possible expansion of perforations, the characteristics are desired to shift toward the sides of higher sensitivity. The reason possibly is that the perforation in this case calls for a higher pressure than the perforation by the flash irradiation method and, consequently, the liability of perforations to expanding is lowered. The foregoing statements about the film for the perforation by the use of a thermal head apply to the film for perforation by the laser beam. In this case, the film of this invention proves convenient when it incoporates therein an absorptive or reactive substance.

Further, the film may be produced in a multi-layer sturcture satisfying all the characteristics mentioned above and enjoying a high added value; incorporating in the multi-layer structure a sensitizing layer, a high strength layer, an adhesive layer, an anti-sticking layer, a colored layer, a protective layer, a heat insulation layer, a supporting layer and so on, for example. The shape of this multi-layer film is not specifically limited. When the film is intended to be perforated by the flash irradiation method, it is required to exhibit perviousness to the main wave-length of the energy ray to be used and absorb the energy ray sparingly while admitting of slight scattering of the energy ray. This requirement does not apply to the film which is intended to be perforated by the thermal head method. The film strength is determined by following the ASTM-D882-67 method, with necessary modifications. The strength at rupture is not less than 5 kg/mm$^2$, desirably not less than 7 kg/mm$^2$, and more desirably not less than 10 kg/mm$^2$. The elongation is not less than 20%, desirably not less than 30%, and more desirably not less than 50%. The modulus of elasticity is at least 50 kg/mm$^2$, desirably not less than 75 kg/mm$^2$, more desirably 100 kg/mm$^2$, still more desirably not less than 150 kg/mm$^2$, and most desirably not less than 200 kg/mm$^2$. The numerical values given above are averages between those in the longitudinal direction and those in the lateral direction.

As regards the method for the formation of film, any method selected from among the simultaneous biaxial inflation method, the simultaneous biaxial tentering method, and the sequential biaxial tentering method can be adopted so long as the produced film satisfy the aforementioned film properties. Desirably, the film is formed by the simultaneous biaxial method in a multi-layer structure at the highest expansion ratio at the lowest possible temperature under conditions unreadily attainable in a single layer structure. At times, the bubble method may prove more desirable. Optionally, the aforementioned characteristics may be freely adjusted within the ranges contemplated by this invention by a heat treatment or an after-stretching treatment. For special applications, the film may be formed by the mono-axial stretching method. In this case, the aforementioned characteristics are considered only in the direction of stretching.

Optionally, the thermoplastic resin for use in the film of the present invention may incorporate therein known additives such as a stabilizer to resist heat or ultraviolet light, a slidant, an antiblocking agent, a plasticizer, an antistatic agent, a pigment, and dye. Of course, the formed film may be suitably coated.

Then, the porous supporting member for use in the present invention is required to be pervious to the printing ink and incapable of being substantially deformed under the heating conditions used for the perforation of the film and, therefore, is selected from among non-woven fabrics, woven fabrics, and other porous materials made of natural fibers and synthetic fibers. In the case of a non-woven type supporting member resembling an onionskin, the basis weight is in the range of 30 to 3 g/m$^2$, desirably 20 to 4 g/m$^2$, and more, desirably 15 to 4 g/m$^2$. In the case of a woven type supporting member resembling a mesh, the fineness of texture is in the range of 500 to 15 mesh, desirably 300 to 50 mesh, and more desirably 250 to 80 mesh. This property is selected suitably, depending on the resolving power required for the printing. The bonding of the film to the porous supporting member is effected by adhesion with an adhesive agent or by thermal fusion under the conditions incapable of impairing the perforation property of the film. In this case, the superposition may be effected by using an adhesive agent dissolved in a solvent. Otherwise, it may be carried out by any of the conventional methods using a varying adhesive agent such as a hot-melt type, an emulsion-latex type, a reaction type, or a powder type adhesive agent. Desirably, the adhesive agent is used in a solid content in the range of 0.1 to 8 g/m$^2$, desirably 0.5 to 5 g/m$^2$, and more desirably 1 to 4 g/m$^2$.

Especially, the film of the present invention can be used by itself as a stencil film having no supporting member. This film is suitable for producing an image consisting of separate dots or continuous lines by the flash irradiation method or the thermal head method. Where the film has a possibility of losing portions thereof surrounded by continuous lines of an image, it may be used as superposed on a porous supporting member as conventionally practised.

A film or stencil sheet which possesses substantially separate perforations of 1 to 200 dots per 1 mm at least in one direction of a perforated area inserted with the thermal head or the laser beam can be used for printing and other use.

The low-energy perforation property (perforation sensitivity) which constitutes the salient characteristic of the film of this invention is evaluated by perforating a sample film with a commercially available flash irradiation type perforator (a xenon lamp grade perforator having a nominal capacity of 3400 Joul and a light receiving surface of 25×35 cm$^2$, produced by Riso Kagaku Co., Ltd. and marketed under trademark designation of "Riso Xenofax FX-180") in a constant temperature bath at 21° C. under RH 50%, with the emission energy per unit area varied from 0.5 to 4.0 Jourl/cm$^2$. The low energy area level was adjusted by inserting a filter. As an original for copying, a standard paper having one black slender line (0.10 mm in width) of a prescribed length printed thereon is used. A sample film sheet under test (not laminated so as to be evaluated severely) is superposed on the original, directed toward a light source. A woven fabric of 150 mesh is placed beneath the film so as to keep the glass face of the perforator from direct contact with the film. Then, the perforator is set operating to perforate the film by flashing with a prescribed amount of energy. The holes formed in the film are observed by means of photomicrography. The low-energy perforation property of the film is rated by the minimum energy level required for perfect perforation (with a line 0.10 mm −10% to +20% in width), on the following scale, judging the sample as having satisfactory low-energy perforation property when the perforation is effected with an energy level less than the aforementioned range of 2.0 to 2.5 Joul/$cm^2$.

⊚: 1.5∼2.0 Joul/$cm^2$

○: 2.0∼2.5 Joul/$cm^2$

Δ: 2.5∼3.0 Joul/$cm^2$

X: 3.0∼3.5 Joul/$cm^2$

XX: 3.5∼4.0 Joul/$cm^2$

XXX: effective perforation difficult

A sample which has been perforated and rated in the method described above and suffers the formed perforations to expand (beyond 20% plus the width of a line of the original) and suffers an unperforated portion to remain in the part expected to be perforated is rated as ⊗.

The film is tested for thermal head perforation property by superposing (not laminating) a woven fabric (150 mesh) on a sample film, placing the film in fast contact with the head surface, setting a thermal transfer type desk-top word processor operating, with the concentration scale fixed at the mark "Max," using the prepared stencil to print copies with an automatic stencil printer (produced by Riso Kagaku Co., Ltd., and marketed under trademark designation of "Risograph 7200E"). The thermal head perforation property is rated with the printed image on the following scale. A sample given the mark not less than ○ is judged to be acceptable.

⊚: Highly clear print (corresponding to perforation rate of 90–110%)

○: Slightly obscure but amply dicipherable print (corresponding to perforation rate of 70–90%)

Δ: Fairly obscure but barely dicipherable (corresponding to perforation rate of 30–70%)

X: Heavily obscure print and totally undicipherable (corresponding to perforation rate of 10–30%)

XX: Hardly no sign of ink (perforation of less than few %)

wherein, with the concentration scale of the word processor fixed at the mark "Mini" (minimum output), the result which gained the same mark as the above mark ⊚ was evaluated as ◉.

In view of the above two groups of perforation evaluation, the preferable level of the perforation of the present invention is as a rule on or above the mark ○. When the evaluation is marked Δ on the one hand and ○ or above on the other, so marked print is included in the scope of the present invention. The above marks come to be better in order of XXX<XX<X<Δ<○<⊚<◉.

For evaluation of the dimensional stability, a sample film is treated in a hot air circulation constant temperature bath at 50° C. for 10 minutes. When the sample sustains any irrefutably unacceptable thermal shrinkage (2 to 3% or over in area), it is judged as rejectable.

The stencil film or sheet is given an overall evaluation by the test for perforation property and the test for dimensional stability. A stencil film or sheet satisfying all the performance tests is judged acceptable.

The test for thermal shrinkage is performed by leaving a sample film of the square of 50 mm standing in a hot air circulation constant temperature bath at 100° C. for 10 minutes, measuring the amount of shrinkage consequently sustained by the film, dividing the amount by the original size and expressing the quotient in percentage, and adopting the average of percentages in the longitudinal direction and those in the lateral direction. (For the evaluation of dimensional stability, similar values obtained at 50° C. are used.) The evaluation is also effected similarly at other temperatures.

The test of a film for thermal shrinkage stress is carried out by cutting the film into strips 10 mm in width, setting the film strips each in a 50-mm gap of a chuck fitted with a strain gauge, immersing the film strips each in a silicone oil bath kept at a varying temperature, and measuring the stress consequently produced in the film strips. For the film strips bathed with silicone oil at temperatures not exceeding 100° C., the test results after 10 seconds' immersion are adopted. For the film strips bathed similarly at temperatures exceeding 100° C., the test results after 5 seconds' immersion are adopted. Then, from a graph having the relation between the values of thermal shrinkage stress and those of heating temperature plotted therein, the maximum value of the thermal shrinkage stress is read out and reported as the peak of thermal shrinkage stress. The temperature which gives this peak value is reported as the temperature for the peak of thermal shrinkage stress.

The temperature coefficient due to melt viscosity variation is determined as follows. With a capillary fluidity tester (type E, having a capillary diameter of 1.0 mm and a length of 10.0 mm, produced by Toyo Seiki Seisakusho and marketed under trademark designation of "Capirograph" 1985), a sample placed in the tester is heated at temperatures increased at pitches of 10° C. At each of the temperatures, the melt viscosity [VI (poise)] of the sample is measured under the condition of shear rate of 6.08 $sec^{-1}$ (extrusion speed of 0.5 mm/min.). Then the logarithms of the melt viscosity (log VI) and the corresponding heating temperatures are plotted in a graph. From this graph, the temperature difference required for the value of log VI to vary from 5.0 to 4.0 is read out as a temperature coefficient of melt viscosity.

Generally, in the case of polyethylene terephthalate, the degree of crystallinity is calculated by applying an actually found value of density to the formula, $\rho=1.47X+1.331(1-X)$, expressing the relation between the density at 25° C. ($\rho$ g/$cm^3$) and the degree of crystallinity (X%). Here, the density of a film is found by measuring the density by the density gradient tube method at 23° C. following JIS K-7112 with necessary modifications, reducing the value in temperature, and applying the product of reduction to the aforementioned formula.

The film of this invention for use in the heat-sensitive stencil film or sheet excels the conventional countertype particularly in the following points.

(1) The film excels in low-energy perforation property; it can be perforated efficiently by a thermal head of a low energy level or by a flash printer of a low energy level.

(2) The film suffers sparingly from expansion of perforations during the course of perforation; it can produce stenciled copies of clear prints.

(3) The film is minimally degenerated by aging (variation of size) and enjoys high dimensional stability.

Examples of the invention will now be given without any sense of limiting the invention.

EXAMPLE 1

A substantially amorphous copolymerized polyester [with a Vicat softening point (hereinafter referred to as VSP)] of 82° C., Tg of 81° C., a density of 1.27 g/cm$^3$, an average molecular weight of 26,000, a intrinsic viscosity of 0.75, equivalent to KODAR (trade mark) PETG 6763 by Eastman Kodak Co., Ltd., and with $\Delta T/\Delta$ log VI of 40] consisting of as an acid component mainly terephthalic acid and as an alcohol component mainly 30 mol% of 1,4-cyclohexanedimethanol and 70 mol% of ethyleneglycol was used for the center layer (third layer). A composition prepared by adding as additive 2% by weight of polyoxyethylene nonylphenylether to a mixture composed of 70% by weight of ethylene-vinyl acetate copolymer (containing 10% by weight of vinyl acetate group and with a melt index of 1.0), 15% by weight of ethylene-α-olefin copolymerization elastomer (a density of 0.88 g/cm$^3$ and a melt index of 0.44) and 15% by weight of crystalline polypropylene (containing 4% by weight of random copolymerized ethylene, a melt flow rate of 7, a density of 0.90 g/cm$^3$) was used for the layers (second and fourth layers) adjacent to the center layer. Polypropylene noted above was used for the surface layers (first and fifth layers). These materials were fused in an extruder and extruded as a five-layer raw tube from an annular type multi-layer die. The coextruded raw tube was quenched by a cooling medium and solidified to perpare a multi-layered raw tube. This raw tube was passed between two pairs of nip rollers and then conditioned to an optimum stretching state with air ring and hood by the temperature of a heating zone to 80° to 100° C. and the temperature of a cooling zone to 20° C., and then it was biaxially stretched simultaneously by sealing air under a predetermined pressure in the tube to about 3.5 times in the transverse direction (TD) and about 3.7 times in the machine direction (MD). The obtained film was a uniform film. It was then slitted at its opposite ends and wound into a roll. From this roll of film, the layers other than the center layer were separated. In this way, polyester film Run No. 1 to Run No. 8 having various intended thicknesses were obtained. The separation of the layers could be done smoothly.

Table 1 shows the results of evaluation of basic characteristics of these films.

TABLE 1

[Basic characteristics of films]

| | Run No. 1 | 2 | 3 | 4 | 5 | 6 | 7 |
|---|---|---|---|---|---|---|---|
| Tensile characteristics | | | | | | | |
| Tensile rupture strength (kg/mm$^2$) | 14.0 | 17.5 | 16.4 | 19.7 | 14.8 | 15.0 | 17.5 |
| Tensile rupture elongation (%) | 87 | 60 | 75 | 64 | 80 | 58 | 68 |
| Tensile modulus (kg/mm$^2$) | 260 | 240 | 255 | 270 | 220 | 230 | 245 |
| Film thickness (μm) | 0.7 | 1.5 | 2 | 5 | 7 | 9 | 12 |
| Thermal shrinkage characteristics | | | | | | | |
| Shrinkage (%) (100° C./80° C.) | 70/65 | 68/60 | 66/61 | 75/65 | 70/66 | 65/57 | 68/60 |
| Shrinkage stress (g/mm$^2$) (100° C./80° C.) | 200/400 | 195/420 | 230/430 | 245/720 | 190/450 | 210/500 | 225/610 |
| Peak shrinkage stress (g/mm$^2$)/ Temp. for peak shrinkage stress (°C.) | 400/80 | 500/75 | 460/78 | 800/75 | 450/80 | 580/74 | 740/72 |

| | Run No. 8 | Comparative Sample Run No. 1 | Comparative Sample Run No. 2 | Comparative Sample (a) | Comparative Sample (b) |
|---|---|---|---|---|---|
| Tensile characteristics | | | | | |
| Tensile rupture strength (kg/mm$^2$) | 16.8 | 15.5 | 14.7 | 19.2 | 6.1 |
| Tensile rupture elongation (%) | 80 | 90 | 110 | 45 | 88 |
| Tensile modulus (kg/mm$^2$) | 250 | 210 | 205 | 525 | 31 |
| Film thickness (μm) | 15 | 18 | 25 | 2 | 7 |
| Thermal shrinkage characteristics | | | | | |
| Shrinkage (%) (100° C./80° C.) | 60/54 | 63/56 | 61/53 | 0/0 | 10/5 |
| Shrinkage stress (g/mm$^2$) (100° C./80° C.) | 215/520 | 205/440 | 180/410 | 0/0 | 45/30 |
| Peak shrinkage stress (g/mm$^2$)/ Temp. for peak shrinkage stress (°C.) | 600/70 | 560/70 | 510/74 | 245/210 | 80/90 |

Comparative Samples Run No. 1 and No. 2 have excessive film thicknesses. Comparative Sample (a) is a film consisting of polyethylene terephthalate with a crystallinity of 45%, mp of 256° C., and a density of 1.384 g/cm$^3$. Comparative Sample (b) is a film consisting of vinylidene chloride-vinyl chloride copolymer (containing 6% by weight of plasticizer and with mp of 156° C.). Regarding the dimensional stability, Samples Run No. 1 to Run No. 8 all substantially started to shrink at a temperature not less than 60° C., so that there was no problem. Comparative Sample (a) gradually shrank at a temperature not less than 180° C. Comparative Sample (b) started to shrink gently from a temperature of 48° C. Particularly, it shrank to a greater extent as the processing time was elongated. This tendency was not recognized with the other films.

Then, a non-woven fabric (thin tissue) mainly composed of manila linen fiber with a basis weight of 8 g/m$^2$ was laminated as a supporting member to each of the films of Samples Run No. 1 to Run No. 8 and Comparative Samples Run No. 1 and Run No. 2 using a methanol solution of a vinyl acetate type adhesive with the weight adjusted such that the solid component was 3 g/m$^2$. The obtained sheet was then dried to obtain a stencil. Perforation tests were effected on the above laminated films or sole films (non lamination) by the flash irradiation method or thermal head method in the manner as described in the description. The flash irradiation test proved that the films of Samples Run No. 1 to Run No. 6 were perforated sufficiently satisfactorily in a low energy range, and their perforations were evaluated all as mark ⊙. Samples Run No. 7 and Run No. 8 were rated as ○. Of these films, the latter rather tended to retain refuse. Comparative Sample Run No. 1 had a level of mark X. Comparative Sample Run No. 2 was insufficiently perforated even at 4.0 Joul/cm$^2$.

Comparative Sample (a) had a level of mark X, while Comparative Sample (b) had a level of mark Δ+⊗. With these films, carbonization decomposition refuse remained, and irritating odor was produced. Further detailed tests proved that while the films of Samples Run No. 1 to Run No. 6 had the level of mark ⊙ as noted above, Samples Run No. 1 to Run No. 3 could be effectively perforated even at an energy level of 1.0 to 1.5 Joul/cm$^2$. No trend toward enlargement of perforations was recognized even at an energy level of 2.0 to 3.0 Joul/cm$^2$ or above, and stable perforation state could be obtained at wide ranges of energy level. The films of Samples Run No. 4 to Run No. 6 showed a similar tendency of energy level of 2.0 to 3.0 Joul/cm$^2$ or above. At an energy level of 1.0 to 1.5 Joul/cm$^2$, Samples Run No. 4 to Run No. 6 showed opening ratios of 85%, 80%, and 50%, respectively. Samples Run No. 7 and Run No. 8, however, showed a tendency to acquire slight enlargement of perforations at an energy level of 2.5 to 3.0 Joul/cm$^2$ or at an excessive energy level. In an energy level range of 1.5 to 2.0 Joul/cm$^2$ which is lower than the adequate energy level noted above, the opening ratios of the portion of these films to be perforated were 70% and 50%, respectively. At an energy level range of 1.0 to 1.5 Joul/cm$^2$, they were 40% and 20%, respectively. The film of Comparative Sample Run No. 1 had an evaluation level of mark X, and had a tendency to remain refuse. Further, there was a tendency to enlarge the perforations at a higher energy level. At a low energy level of 2.5 to 3.0 Joul/cm$^2$, 2.0 to 2.5 Joul/cm$^2$, and 1.5 to 2.0 Joul/cm$^2$, the opening ratios were 80%, 60%, and 25%, respectively. Comparative Sample Run No. 2 was excessively thick and its opening ratio was about 50% even at 4.0 Joul/cm$^2$. It was about 20% at a low energy level of 3.0 to 3.5 Joul/cm$^2$ and 4 to 5% at a level of 2.5 to 3.0 Joul/cm$^2$. The perforation could not be effected at an energy level lower than this range.

Comparative Sample (a) had an evaluation level of mark X and an opening ratio of 95%. At an energy level in the range of 3.5 to 4.0 Joul/cm$^2$, the opening ratio was 110%. At a low energy level of 2.5 to 3.0 Joul/cm$^2$, the opening ratio was 50%, and at an energy level of 2.0 to 2.5 Joul/cm$^2$, it was 0%. Comparative Sample (b) had an evaluation level of mark Δ+⊗ and it had a tendency to enlarge the perforations, showing the opening ratio of 130% even at an energy level of 2.0 to 2.5 Joul/cm$^2$. Further, the opening ratio was 170% at 2.5 to 3.0 Joul/cm$^2$, 200% at 3.0 to 3.5 Joul/cm$^2$, and 40 to 50% at 1.5 to 2.0 Joul/cm$^2$. It was 0% at 1.5 Joul/cm$^2$ or lower. The test results by the thermal head method were as follows. Samples Run No. 1 to Run No. 3 were tested in a state laminated with a supporting member. Samples Run No. 4 to Run No. 6 were tested with and without the supporting member laminated. Samples Run No. 7 and Run No. 8 and Comparative Samples Run No. 1 and Run No. 2 were tested without the supporting member but in a state as placed on a predetermined fabric. Comparative Samples (a) and (b) were tested in a laminated state. The films of Samples Run No. 1 and Run No. 6 had an evaluation level of mark ◎, and sufficient perforation could be obtained even at a low energy level of the aforementioned word processor. Sufficient perforation could also be obtained at a high energy level, and the phenomenon of perforation enlargement was substantially nil. With Samples Run No. 4 to Run No. 6, no substantial difference was recognized between the presence and absence of the supporting member. In the case of the absence of the supporting member, these Samples could be perforated faithfully after the pattern of the thermal head dots, and polymer in the pattern of a rattice remained among adjacent dots, so that perforated symbols were retained without being detached. Satisfactory printing thus could be obtained. With Samples Run No. 7 and Run No. 8 which were not laminated with the supporting member, satisfactory bridges were formed to reinforce the formed perforations. These films had evaluation levels of marks ◎ and ⊙. The film (stencil film) of Sample Run No. 8 showed an evaluation level of mark ○ at a low energy level. The sole film of Sample Run No. 7 perforated was partly mounted on the printer drum noted above with a supporting member therebetween, and 1,000 copies were printed. The print was clear, and there was no missing image. Sample Run No. 1 and Comparative Sample Run No. 2 had respective perforation properties of marks X and XX. These perforation properties corresponded to opening ratios of 30% and 0%, respectively. Comparative Sample (a) had an evaluation level of mark X and a perforation factor of about 15%. Comparative Sample (b) had an evaluation level of mark XX and an opening ratio of 1 to 2%.

EXAMPLE 2

The same copolymerized polyester as in Example 1 was fused and kneaded in an extruder and extruded from a T type die to be quenched to form raw films. These raw films were biaxially stretched by a batch method of hot-air heating type with the stretching temperature and stretching ratio (same ratio in the TD and MD) freely set to obtain films having characteristics as shown in Table 2. To increase the shrinkage stress, the film was stretched at a low temperature. In some cases, the multi-layered raw film obtained in Example 1 was used and stretched by cold drawing (a temperature lowered to the neighborhood of 60° C.). To reduce the stress and increase the shrinkage factor, a high stretching ratio (for instance about 4.5×4.5 times) was adopted at a high temperature (in the neighborhood of 100° C.). In some case, the heat set was done under a fixed or free state.

TABLE 2

| | Run No. | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| Shrinkage (%) (100° C.) | 60 | 50 | 78 | 75 | 45 | 43 | 43 | 50 | 30 | 22 | 19 | 34 |
| Shrinkage stress (g/mm$^2$) (100° C.) | 360 | 330 | 160 | 110 | 110 | 170 | 420 | 460 | 220 | 350 | 450 | 445 |
| Film thickness (μm) | 4 | 5 | 6 | 8 | 10 | 5 | 5 | 5 | 3 | 5 | 3 | 2 |

The films produced were then perforated in conformity to the predetermined evaluation standards of flash irradiation method and thermal head method. The results with Samples Run No. 9 to Run No. 20 by the flash irradiation method/thermal head method were ◎/⊚, ◎/⊚, ◎/◎, ◎/○, ○/○, ◎/◎, ◎/⊚, ◎+□/⊚, ○/○, ○/○, ○/○, ◎+□/◎. Samples Run No. 16 and Run No. 20 had a tendency to enlarge the perforations in the case of the flash irradiation method, and their opening ratios were 140% and 130%, respectively. When these films were evaluated with a 150-mesh polyester screen superposed in the manner as described in Example 1, a tendency of perforation enlargement could be suppressed to some extent, and the opening ratios were 110% and 105%, respectively.

The other firms had characteristics all in satisfactory ranges.

COMPARATIVE EXAMPLE 1

Films as shown in Table 3 were obtained in the same manner as described in Example 2. Comparative Sample Run No. 10, however, was a non-stretched film. A film with a shrinkage of 80% or above at 100° C. and a shrinkage stress of 400 to 500 g/mm$^2$ at 100° C. could not be obtained because of breakage during stretching. Also, a film with a shrinkage stress of over 500 g/mm$^2$ could not be obtained.

Films outside the scope of this invention were obtained with the stretching ratio decreased and the stretching temperature increased. Films falling in the scope of this invention could be obtained by stretching for predetermined several seconds in a state set on a frame at a temperature of 100° C. or above.

TABLE 3

| | Comparative Sample Run No. | | | | | | | | |
|---|---|---|---|---|---|---|---|---|---|
| | 3 | 4 | 5 | 6 | 7 | 8 | 9 | 10 | 11 |
| Shrinkage (%) (100° C.) | 60 | 27 | 12 | 7 | 24 | 11 | 43 | 2 | 78 |
| Shrinkage stress (g/mm$^2$) (100° C.) | 55 | 70 | 180 | 50 | 140 | 320 | 25 | 0 | 280 |
| Film thickness (μm) | 3 | 2 | 4 | 3 | 5 | 4 | 5 | 1 | 10 |

These Comparative Samples Run No. 3 to Run No. 11 were perforated by the flash irradiation method and thermal head method and evaluated based on the predetermined criterion noted above. The results in the flash irradiation method/thermal head method order were XX/X, XXX/XX, XXX/XX, XXX/XX, XX/X, XX/Δ, XXX/XX, XXX/XX, and ⊙+Δ/⊙. Comparative Sample Run No. 10 could not be perforated by either method despite the fact that it had a small thickness. With high energy flashing, it was fused to the original and was broken when it was separated. Comparative Sample Run No. 11 showed a tendency to enlarge the perforations in the case of the flash irradiation method. Thus, the films having shrinkage characteristics outside the scope of this invention had unsatisfactory low heat perforation quality. Comparative Samples such as Run No. 6 and Run No. 10 were not effectively perforated even with a high energy source. In addition, some of them were deteriorated and deformed by high energy applied at the time of the treatment.

EXAMPLE 3

For Sample Run No. 21, copolymerized polyester consisting of as an acid component mainly terephthalate and as an alcohol component mainly 60 mol% of ethyleneglycol and 40 mol% of 1,4-cyclohexane dimethanol was used. For Sample Run No. 22, copolymerized polyester consisting of the same acid component as above and as an alcohol component mainly 80 mol% of ethylene glycol and 20 mol% of 1,4-cyclohexane dimethanol was used. For Sample Run No. 23, copolymerized polyester consisting of as an acid component 80 mol% of telephthalate, 15 mol% of isophthalic acid and 5 mol% of adipic acid and as an alcohol component mainly 70 mol% of ethylene glycol, 15 mol% of tetramethylene glycol and 15 mol% of 1,4-cyclohexanedimethanol was used. These materials were treated in the same manner as described in Example 1 and quenched to obtain amorphous raw films. These raw films were stretched to 3×3 times at 95° C. with the batch type simultaneous biaxial tenter as noted above, thus obtaining films having thicknesses of about 4, 3, and 4 μm. These films had crystallinity of 4, 3, and 0%.

The material resins had intrinsic viscosities of 0.73, 0.71, and 0.70, respectively. Their ΔT/Δ log VI was all in the range of 40 to 10. Their VSPs were 84°, 79°, and 75° C. respectively. The crystallinity of all the resins was not more than 10%. As for the thermal shrinkage characteristics of the films, the thermal shrinkage start temperatures were 70°, 65° and 62° C., respectively. The peak thermal shrinkage stresses were 310, 325 and 340 g/mm$^2$, respectively. The temperatures corresponding to the peaks were 80° to 90° C. At 80° C., the thermal shrinkages were 34, 30, and 25%, respectively and the thermal shrinkage stresses were 300, 300, and 320 g/mm$^2$, respectively. At 100° C., the thermal shrinkages were 47, 38 and 33%, respectively and the thermal shrinkage stresses were 280, 290 and 300 g/mm$^2$, respectively. The other characteristics were all in satisfactory ranges. As for the perforation property based on the standards noted above, all the films had an evaluation level of mark ○ by the flash irradiation method and an evaluation level or mark ○ by the thermal head method. With copolymer of Sample Run No. 22 with the intrinsic viscosity of 0.40, ΔT/Δ log VI was not more than unity and could not be sufficiently measured. Also, its melt viscosity at the time of the extrusion was low, and a uniform raw film could not be obtained. Further, although a raw film could be obtained by compression molding, it had a mechanical strength to low to be stretched.

Polymers obtained with the composition of Sample Run No. 21 by setting the temperature coefficient ΔT/Δ log VI to 66, 75, and 85, all had shrinkage characteristics in satisfactory ranges. The perforation property was of mark ○, mark ○ and mark ○ by the flash irradiation method and of mark ○, mark ○ and mark ○ by the thermal head method, respectively. The performance tended to be reduced slightly with increase of the above coefficient. With a value of 115, problems are encountered at the time of the extraction. In addition, the perforation property was of mark Δ by both the flash irradiation method and thermal head method.

EXAMPLE 4

For Sample Run No. 24, a composition obtained by adding 25 mol% of polyethylene terephthalate (to be mentioned in subsequent example) to 75 mol% of copolymerized polyester of Example 1 was used. For Sample Run No. 25, a composition obtained by adding 30 mol% of polybutylene terephthalate (with an intrinsic viscosity of 0.71, ΔT/Δ log VI of 10 and Tg of 50° C.) to 70 mol% of polymerized polyester of Example 1 was used. These resins were stretched in the same manner as described in Example 3 to obtain films. These films had crystallinity of 2-3% and 0%, respectively, before the heat treatment and 7% and 2%, respectively, after the heat treatment (120° C. for 5 seconds). Here, the characteristics were evaluated for the films before the heat treatment. The compositions after the mixing had ΔT/Δ log VI of 30 and 25, respectively, the thermal shrinkages at 100° C. of 52 and 56%, respectively, and the thermal shrinkage stresses at 100° C. of 200 and 180 g/mm$^2$, respectively. The other thermal shrinkage characteristics were all in satisfactory ranges described in the specification.

The perforation property of all the resins was of mark ○ by the flash irradiation method and of mark ○ by the thermal head method.

EXAMPLE 5

Polyethylene terephthalate [an intrinsic viscosity of 0.67 at 30° C. in phenol:tetrachloroethane=60:40 (% by weight), Tg of 69° C., ΔT/Δ log VI of 6, and crystallinity of 50% when sufficiently annealed as resin] and polybutylene terephthalate (same as Sample Run No. 25) were used to obtain quenched raw films in the manner as described in Example 2 or 1. These raw films were heated to 90° C. and immediately stretched to 3.5×3.5 times, thus obtaining films of Samples Run No. 26 and Run No. 27 having a thickness of 2 μm. As for the characteristics of these films, the crystallinityies were 8% and 10%, the thermal shrinkage start temperatures 65° C. and 75° C., the peak thermal shrinkage stress 580 and 400 g/mm$^2$, temperatures for the peak thermal shrinkage stress 95° C. and 100° C., the thermal shrinkages at 80° C. 32% and 25%, the thermal shrinkage stresses at 80° C. 400 g/mm$^2$ and 320 g/mm$^2$, the thermal shrinkages at 100° C. 37% and 35%, and the thermal shrinkage stresses at 100° C. 490 g/mm$^2$ and 360 g/mm$^2$, respectively. The other characteristics of the films were all in satisfactory ranges. Their perforation properties were of mark ○ and mark ○ by the flash irradiation method and of mark ○ and mark ○ by the thermal head method, respectively.

As Sample Run No. 28, a film consisting of the aforementioned resin and having a thickness of 7 μm was obtained. This film had substantially the same characteristics as the aforementioned film. The perforation property of the film was of mark ○+□ by the flash irradiation method, and there was a slight tendency to have enlarged perforations. It was of mark Δ by the thermal head method. The low temperature perforation property tended to be inferior to the film having the same thickness and utilizing the amorphous resin of Example 1. The melted portions around the perforation or the bridges remaining on the film after the pattern of the sections positioned among the thermal head elements seemed to be highly crystallized, because the obtained film was fragile, and had a printing durability of a somewhat low level. This phenomenon was not recognized with the films of Example 1.

EXAMPLE 6

The same resin as polyethylene terephthalate of Example 5 was used by following the procedure of Example 5 to obtain a quenched raw film, which was heated to 95° C. Immediately, the heated raw film was stretched to 3×3 times and then subjected to a suitable heat treatment, thus obtaining a film of Sample Run No. 29 having a thickness of 3 μm (a crystallinity of 16%, thermal shrinkage start temperature of 65° C., peak thermal shrinkage stress of 500 g/mm$^2$, the temperature for the peak thermal shrinkage stress of 95° C., thermal shrinkage at 80° C. of 13%, thermal shrinkage stress at 80° C. of 350 g/mm$^2$, thermal shrinkage at 100° C. of 16%, and thermal shrinkage stress at 100° C. of 485 g/mm$^2$) and Sample Run No. 30 (a crystallinity of 25%, a peak thermal shrinkage stress of 300 g/mm$^2$, the temperature for the peak thermal shrinkage stress of 128° C., thermal shrinkage at 80° C. of 10%, thermal shrinkage stress at 80° C. of 150 g/mm$^2$, thermal shrinkage at 100° C. of 15%, and thermal shrinkage stress at 100° C. at 285 g/mm$^2$). The other characteristics of the Samples Run No. 29 and Run No. 30 were all in satisfactory ranges. The evaluation results of these films by the flash irradiation method were of mark ○ and mark ○, respectively and those by the thermal head method were of mark ○ and mark Δ, respectively.

COMPARATIVE EXAMPLE 2

The same polyethylene terephthalate as in Example 5 was stretched by the procedure of Example 5. The film obtained was set on a stationary frame and subjected to a heat treatment in an air oven at a temperature of 100° to 140° C. for a time of 5 to 1 minute to obtain crystallized polyester films. These films had a crystallinity of about 45% and thicknesses of 1.0 μm, 1.5 μm, 2 μm, 4 μm, 6 μm, and 10 μm respectively (Comparative Samples Run No. 12 to Run No. 17). These films had substantially the same characteristics as the aforementioned Comparative Sample (a). All these films were outside the scope of this invention in view of the shrinkage characteristics. The perforation properties of these films by the flash irradiation method were X, X, X, XXX, XXX and XXX, respectively. With a thickness of not less than 4 μm, effective perforations could not be obtained. The perforation properties by the thermal head method were X, X, X, XX, XX and XX, respectively. No perforation could be effectively formed at a low energy level. The films with crystallinities of 33%, 35% and 38% (Comparative Samples Run No. 18 to Run No. 20) having a thickness of 2 μm had the perforation properties of X, X and X by the flash irradiation method and Δ, X and X by the thermal head method. As for the shrinkage characteristics, the thermal shrinkages at 100° C. were 8%, 5% and 2%, and the shrinkage stresses at 100° C. were 60, 30 and 10 g/mm$^2$.

EXAMPLE 7

For Sample Run No. 31, copolymerized polyester consisting of as an acid component 75 mol% of terephthalic acid and 25 mol% of isophthalic acid and as an alcohol component 50 mol% of 1,4-butanediol and 50 mol% of ethylene glycol (mp of 185° C., ΔT/Δ log VI of 10 and VSP of 125° C.) was used. For Sample Run No. 32, copolymerized polyester consisting of as an acid component 70 mol% of terephthalic acid, 10 mol% of isophthalic acid, 15 mol% of adipic acid and 5 mol% of succinic acid and as an alcohol component 30 mol% of 1,4-butanediol and 70 mol% of ethyleneglycol (mp of 133° C., ΔT/Δ log VI of 7, and VSP of 88° C.) was used. For Sample Run No. 33, copolymerized polyester consisting of as an acid component 90 mol% of terephthalic acid and 10 mol% of isophthalic acid and as an alcohol component 80 mol% of ethyleneglycol, 10 mol% of 1,4-cyclohexane dimethanol, and 10 mol% of 1,4-butanediol (mp of 158° C., ΔT/Δ log VI of 15 and VSP of 130° C.) was used. These resins were treated in the same manner as described in Example 1 to obtain raw films. These raw films were stretched at 85° C. by a batch type stretcher to 3.0×3.0 times to obtain stretched films with a thickness of about 4 μm. These films had the crystallinity of not more than 10%. Their thermal shrinkage characteristics at 100° C. were 67%, 62% and 77%, respectively. The shrinkage stresses at 100° C. were 220 g/mm$^2$, 190 g/mm$^2$ and 225 g/mm$^2$, respectively. The dimensional stability was satisfactory. The other characteristics were all in satisfactory ranges.

The perforation properties of all these films were of mark ○ by the flash irradiation method and of mark ○ by the thermal head method.

EXAMPLE 8

Nylon 6-12 copolymer resin (Daicel Chemical Industries, "Diamid N-1901", with ΔT/Δ log VI of 50, a melting point of 150° C., a crystallinity of 13% of a VSP of 105° C.) was fused and extruded together with the EVA type resin similar to that used in the previous example such that the nylon layer was sandwiched using a multi-layer circular die to obtain a quenched raw film. The raw film was heated to 85° C. and stretched to 2.5×2.5 times by the same method as in Example 2, and then subjected to heat setting at 80° C. for 20 seconds by a stationary method. Then, an intended nylon type film with a thickness of 3 μm (a thermal shrinkage start temperature of 65° C., a peak thermal shrinkage stress of 400 g/mm$^2$, a temperature for the peak thermal shrinkage stress of 90° C., a thermal shrinkage at 80° C. of 18%, a thermal shrinkage stress at 80° C. of 350 g/mm$^2$, thermal shrinkage at 100° C. of 40%, and a thermal shrinkage stress at 100° C. of 390 g/mm$^2$) was obtained as Sample Run No. 34 by separating it from a multi-layer stretched film. The low-energy perforation properties of the film were of mark ○ by the flash irradiation method and of mark ○ by the thermal head method.

EXAMPLE 9

ε-caprolactum, hexamethylene diamine and adipic acid were subjected to polymerization condensation by a well-known method in a batch type polymerization reactor such that the ratio of nylon 6 component to nylon 66 was 77 mol% to 23 mol% to obtain nylon 6-66 copolymer resin. This resin had a melting point of 180° C., a crystallinity of 19% and a ΔT/Δ log VI of 55. This resin was stretched to prepare a film in the manner as described in Example 8 to 3×3 times at 85° C. and then the film was subjected to heat setting at 80° C. for 20 seconds by the stationary method, followed by separation. The film with a thickness of 3 μm thus obtained (a thermal shrinkage start temperature of 65° C., a peak thermal shrinkage stress of 320 g/mm$^2$, a temperature for the peak thermal shrinkage stress of 95° C., a thermal shrinkage at 80° C. of 28%, a thermal shrinkage stress at 80° C. of 200 g/mm$^2$, a thermal shrinkage at 100° C. of 35%, and a thermal shrinkage stress at 100° C. of 290 g/mm$^2$) was evaluated. The perforation property of the film was of mark ○ by the flash irradiation method and of mark ○ by the thermal head method (Sample No. 34).

EXAMPLE 10

ε-caprolactum, hexamethylene diamine and adipic acid were used for nylon 6 nylon 66 component. As an additive copolymerization component, terephthalic acid was used to partly take place of the adipic acid. In other words, the composition was adjusted to be 65 mol% of nylon 6 component and 35 mol% of nylon 66 component. Then, 40 mol% of adipic acid of the nylon 66 component was replaced by terephthalic acid to obtain a polymer in a well-known method. This polymer had a ΔT/Δ log VI of 35, a melting point of 170° C. and a crystallinity of 8%. The copolymer was processed in the same manner as described in Example 8 and stretched to 3×3 times at 85° C. Then, it was subjected to heat setting at 80° C. for 20 seconds by the stationary method, followed by separation to obtain a film having a thickness of 4 μm (Sample No. 35). This film had a thermal shrinkage at 100° C. of 43% and a thermal shrinkage stress at 100° C. of 260 g/mm$^2$. The low-energy perforation properties were of mark ○ by the flash irradiation method and of mark ○ by the thermal head method.

COMPARATIVE EXAMPLE 3

A film having a thickness of 3 μm, which was formed of nylon 6 resin (Toray Co. Ltd., "CM1021XF", a ΔT/Δ log VI of 60, a mp of 220° C. and a VSP of 217° C.) in the same manner as described in Example 8, had a crystallinity of 33%, a thermal shrinkage start temperature of 65° C., a peak thermal shrinkage stress of 300 g/mm$^2$, a temperature for the peak thermal shrinkage stress of 105° C., a thermal shrinkage at 80° C. of 10%, a thermal shrinkage stress at 80° C. of 240 g/mm$^2$, a thermal shrinkage at 100° C. of 13%, and a thermal shrinkage stress at 100° C. of 270 g/mm$^2$. The perforation property was of mark X by the flash irradiation method and of mark XX by the thermal head method, both showing inferior property. The reason for this was thought to be due to low thermal shrinkage although the thermal shrinkage stress was high (Comparative Sample Run No. 21).

COMPARATIVE EXAMPLE 4

A resin which was obtained by increasing the polymerization degree of nylon 66 resin and had a coefficient of temperature and melt viscosity of ΔT/Δ log VI>100 and a melting point of 255° C. was compression molded into a film by the compression method. This obtained film was quenched repeatedly several times to obtain a thin raw film having a predetermined thickness. This raw film was then stretched at 90° C. to 2.5×2.5 times using a batch type tenter. The stretched film was then heat set at 80° C. for 20 seconds, and separated from a supporting film. The film thus obtained having a thickness of 3 μm (a thermal shrinkage start temperature of 65° C., a peak thermal shrinkage stress of 290 g/mm$^2$, a temperature for the peak thermal shrinkage stress of 100° C. a thermal shrinkage at 80° C. of 10%, a thermal shrinkage stress at 80° C. of 240 g/mm$^2$, a thermal shrinkage at 100° C. of 15%, and a thermal shrinkage stress at 100° C. of 290 g/mm$^2$) was evaluated. The evaluation level was of mark XX+ⓧ by the flash irradiation method and of mark XX by the thermal head method, indicating unsatisfactory low-energy perforation property. The reason for this is thought to be due to a higher coefficient of temperature and melting viscosity ΔT/Δ log VI of not less than 100 (Comparative Sample Run No. 22).

COMPARATIVE EXAMPLE 5

Polypropylene type copolymer (Chisso Co., Ltd., "Chissopolypro F-8277, random copolymerization of 2 to 3% of ethylene, a VSP of 125° C., a mp of 145° C., and ΔT/Δ log VI>100) and a composition consisting of an EVA type resin similar to that of the previous example were coextruded through a multi-layer circular die, followed by solidification by quenching. The raw film thus obtained was heated to approximately 55° C. and then stretched biaxially to three times both in the TD and MD by a bubble method. There was obtained an intended polypropylene type copolymer film (a thermal shrinkage start temperature of 50° C., a peak thermal shrinkage stress of 170 g/mm$^2$, a temperature for the peak thermal shrinkage stress of 85° C., a thermal shrinkage at 80° C. of 15%, a thermal shrinkage stress at 80° C. of 165 g/mm$^2$, a thermal shrinkage at 100° C. of 25%, and a thermal shrinkage stress at 100° C. of 150 g/mm$^2$). The evaluation level was of mark X+Ⓧ by the flash irradiation method and of mark XX by the thermal head method. There was a tendency of requiring a relatively high heat energy for perforation. However, there was refuse remained in the perforations, and there was not any sharpness at the edge of the perforations. Further, there was a problem of attached refuse. One of the most important reasons for this was thought to be a higher coefficient of temperature and melt viscosity $\Delta T/\Delta \log VI > 100$ (Comparative Sample Run No. 23).

COMPARATIVE EXAMPLE 6

For Comparative Sample Run No. 24, ethylene-vinyl acetate copolymer (a vinyl acetate group content of 10% by weight, a melt index of 1.0, a mp of 93° C., a crystallinity of 42%, a VSP of 76° C., a Tg of −120° C. and $\Delta T/\Delta \log VI > 100$) was used. For Comparative Sample Run No. 25, crystalline polybutene-1 (copolymerization of 3% by weight of ethylene, a melt index of 1.0, a mp of 118° C., a crystallinity of 40%, a VSP of 110° C., a Tg of −25° C. and $\Delta T/\Delta \log VI > 100$) was used. Each resin was subjected to tubular stretching at a heating temperature of 35° C., in the same manner as described in Example 1, followed by a predetermined processing to obtain a film having a thickness of 5 μm. The obtained films each had a thermal shrinkages at 100° C. of 60% and 30%, respectively. The thermal shrinkage stresses at 100° C. were 100 f/mm$^2$ and 85 g/mm$^2$, respectively. The latter film had satisfactory dimensional stability, while the former was unsatisfactory. The modulus of elasticities of the films were 15 kg/mm$^2$ and 25 kg/mm$^2$, respectively.

The results of perforation property evaluation were respectively of marks XX+Ⓧ and XXX by the flash irradiation method and of marks XX and XX by the thermal head method. The former film was readily deformed, so that its use was infeasible. In addition, it lacked nerve and was difficult to handle. Further, a perforation test was carried out with a 2 μm thick film of ethylene-vinyl acetate copolymer having the similar characteristics as the Comparative Sample Run No. 24. The evaluation level was of mark Δ+Ⓧ by the flash irradiation method. By the thermal head method, the test could not be made because the film was too weak (Comparative Sample Run No. 26). Further, a film similar to Comparative Sample Run No. 24, with 65% of boiling toluene insoluble gel formed by irradiation with a 15 Mrad energy from an electron beam accelerator (of 500 kV), was gelled, and its melt flow did not occur even at 300° C. The shrinkage of the film at 100° C. was 75%, and the shrinkage stress at 100° C. was 150 g/mm$^2$. It was impossible to measure $\Delta T/\Delta \log VI$. The perforation property was of mark XXX by the flash irradiation method. It could not be measured with the thermal head method (Comparative Sample Run No. 27). The incapability of flow was due to crosslinking. Thus, $\Delta T/\Delta \log VI$ became infinite, so that no perforation could be obtained. The crosslinked structure seems to extremely interfere with the perforation phenomenon.

What is claimed is:

1. A highly heat-sensitive film for stencil, comprising a thermoplastic resin having a coefficient of temperature and melt viscosity ($\Delta T/\Delta \log VI$) of not more than 100 and a thermal shrinkage (X%) at 100° C. and a thermal shrinkage stress (Y g/mm$^2$) at 100° C. falling respectively in the ranges of the formulas; $15 \leqq X \leqq 80$ and $75 \leqq Y \leqq 500$; and both falling in the range of the formula; $-8X+400 \leqq Y \leqq -10X+1000$; having a thickness in the range of 0.5 to 15 μm, and excelling in low-energy perforation property.

2. A film according to claim 1, wherein the thermoplastic resin has a coefficient of temperature and melt viscosity in the range of 80 to 3.

3. A film according to claim 1, wherein said thermoplastic resin has a degree of crystallinity in the range of 0 to 30%.

4. A film according to claim 1, wherein said thermoplastic resin has a Vicat softening point in the range of 40° to 200° C.

5. A film according to claim 1, wherein said thermoplastic resin in a state forming a film has a constitution falling between substantially amorphous level and a degree, 15%, of crystallinity.

6. A film according to claim 1, wherein said thermoplastic resin has, as an additive component, at least one monomer copolymerized therewith in an amount of not less than 10 mol% and not more than 40 mol%.

7. A film according to claim 1, wherein said thermoplastic resin is a thermoplastic resin having copolymerized polyesters and copolymerized polyamides as main components thereof.

8. A film according to claim 7, wherein said copolymerized polyesters and copolymerized polyamides have as an additive component at least one monomer copolymerized therewith in an amount of not less than 10 mol% and not more than 40 mol%.

9. A film according to claim 7, wherein said thermoplastic resin in a state forming a film has a constitution falling between substantially amorphous level and a degree, 15%, of crystallinity.

10. A film according to claim 1, wherein said thermoplastic resin has a substantially amorphous copolymerized polyester as a main component thereof.

11. A film according to claim 1, wherein said thermal shrinkage (X%) of the film at 100° C. falls in the range of $30 \leqq X \leqq 80$ and said thermal shrinkage stress (Y g/mm$^2$) thereof falls in the range of $100 \leqq Y \leqq 450$.

12. A highly sensitive stencil sheet excellent in low-energy perforation property, which stencil sheet comprises a film 0.5 to 15 μm in thickness consisting of a thermoplastic resin having a coefficient of temperature and melt viscosity ($\Delta T/\Delta \log VI$) of not more than 100 and exhibiting a thermal shrinkage (X%) at 100° C. and a thermal shrinkage stress (Y g/mm$^2$) respectively falling in the ranges of the formulas; $15 \leqq X \leqq 80$ and $75 \leqq Y \leqq 500$, and both falling in the range of the formula; $-8X+400 \leqq Y \leqq -10X+1000$; and a porous supporting member permitting permeation therethrough of printing ink, avoiding substantial degeneration under heating conditions existing during the perforation of said film, and having said film laminated thereon.

13. A stencil sheet according to claim 12, wherein said thermoplastic resin has a degree of crystallinity in the range of 0 to 30%.

14. A stencil sheet according to claim 12, wherein said thermoplastic resin has a Vicat softening point in the range of 40° to 200° C.

15. A stencil sheet according to claim 12, wherein said film of thermoplastic resin has a constitution falling between substantially amorphous level and a degree, 15%, of crystallinity.

16. A stencil sheet according to claim 12, wherein said thermoplastic resin is selected from among the thermoplastic resins having copolymerized polyesters and copolymerized polyamides as main components thereof.

17. A stencil sheet according to claim 10 or claim 11, wherein said thermoplastic resin is formed mainly of a substantially amorphous copolymerized polyester.

18. A stencil sheet according to claim 12, wherein said porous supporting member is selected from among thin tissues obtained by combining and bundling fibers of basis weight of 30 to 3 ($g/m^2$) and woven fabrics obtained by weaving fibers 500 to 15 mesh.

19. A stencil sheet according to claim 12, wherein said film and said porous supporting member are bonded to each other with an adhesive composition of 0.1 to 8 ($g/m^2$).

20. A perforated film comprising a film prepared by perforating a film comprising a thermoplastic resin having a coefficient of temperature and melt viscosity ($\Delta T/\Delta \log VI$) of not more than 100 and a thermal shrinkage (X%) at 100° C. and a thermal shrinkage stress (Y $g/mm^2$) at 100° C. falling respectively in the ranges of the formulas; $15 \leqq X \leqq 80$ and $75 \leqq Y \leqq 500$; and both falling in the range of the formula; $-8X+400 \leqq Y \leqq -10X+1000$, having a thickness in the range of 0.5 to 15 μm, and possessing substantially discontinuous perforations 1 to 200 dots/mm at least in one direction of a perforated area.

* * * * *